United States Patent
Bita

(10) Patent No.: US 8,806,070 B2
(45) Date of Patent: Aug. 12, 2014

(54) STORAGE DEVICE, AND STORAGE DEVICE CONTROL METHOD

(71) Applicant: Fujitsu Limited, Kawasaki (JP)

(72) Inventor: Joichi Bita, Ishikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/660,215

(22) Filed: Oct. 25, 2012

(65) Prior Publication Data

US 2013/0159557 A1 Jun. 20, 2013

(30) Foreign Application Priority Data

Dec. 19, 2011 (JP) ................................. 2011-277726

(51) Int. Cl.
*G06F 3/00* (2006.01)

(52) U.S. Cl.
USPC .............................................. 710/6; 711/158

(58) Field of Classification Search
None
See application file for complete search history.

(56) References Cited

U.S. PATENT DOCUMENTS

| 6,006,303 | A * | 12/1999 | Barnaby et al. ............... 710/244 |
| 6,973,036 | B2 | 12/2005 | Goetzinger et al. |
| 7,062,559 | B2 | 6/2006 | Yoshimura et al. |
| 7,457,897 | B1 * | 11/2008 | Lee et al. ........................ 710/74 |
| 7,590,721 | B2 * | 9/2009 | Alfano .......................... 709/223 |
| 7,646,715 | B2 | 1/2010 | Oueslati et al. |
| 7,823,154 | B2 | 10/2010 | Wang et al. |
| 2008/0183871 | A1 * | 7/2008 | Ogawa .......................... 709/226 |
| 2009/0168092 | A1 * | 7/2009 | Chen et al. .................... 358/1.15 |
| 2010/0023712 | A1 * | 1/2010 | Yamaguchi et al. .......... 711/158 |
| 2012/0173786 | A1 * | 7/2012 | Simon et al. .................. 710/308 |

FOREIGN PATENT DOCUMENTS

| JP | 2003-124976 A | 4/2003 |
| JP | 2007-264751 A | 10/2007 |
| JP | 2011-165105 A | 8/2011 |

OTHER PUBLICATIONS

Extended European Search Report dated Mar. 20, 2013 for corresponding European Application No. 12190346.2.
Korean Application Office Action mailed Nov. 29, 2013 for corresponding Korean Application No. 10-2012-121232, with Partial English-language Translation.

* cited by examiner

*Primary Examiner* — Elias Mamo
(74) *Attorney, Agent, or Firm* — Fujitsu Patent Center

(57) ABSTRACT

A storage device includes a memory; and a processor coupled to the memory, wherein the processor executes a process comprising: calculating an upper limit value of the number of input/output processings determined based on priority set to an information processing device, a port that is an interface between the information processing device and the storage device and a memory device of the storage device; scheduling an execution order of input/output processings based on the number of input/output processings received from the information processing device and the calculated upper limit value; and executing the input/output processings in the scheduled execution order.

20 Claims, 17 Drawing Sheets

FIG.4

| PRIORITY | PERFORMANCE VALUE (MB/s) | PERFORMANCE VALUE (IOPS) |
|---|---|---|
| 1 | 750 | 37500 |
| 2 | 700 | 35000 |
| 3 | 650 | 32500 |
| 4 | 600 | 30000 |
| 5 | 550 | 27500 |
| 6 | 500 | 25000 |
| 7 | 450 | 22500 |
| 8 | 400 | 20000 |
| 9 | 350 | 17500 |
| 10 | 300 | 15000 |
| 11 | 250 | 12500 |
| 12 | 200 | 10000 |
| 13 | 150 | 7500 |
| 14 | 100 | 5000 |
| 15 | 50 | 2500 |

FIG.5

| TARGET | PRIORITY | NUMBER OF N MILLISECOND IOS | NUMBER OF N MILLISECOND BLOCKS | NUMBER OF LIMIT IOS | NUMBER OF LIMIT BLOCKS | NUMBER OF CURRENT IOS | NUMBER OF CURRENT BLOCKS |
|---|---|---|---|---|---|---|---|
| FC-CA 201a | 3 | 325 | 13312 | 325×n-a | 13312×n-A | a | A |
| HOST 10a | 5 | 275 | 11264 | 275×n-b | 11264×n-B | b | B |
| HOST 10b | 7 | 225 | 9216 | 225×n-c | 9216×n-C | c | C |
| HOST 10a-LUN-A | 10 | 150 | 6144 | 150×n-d | 6144×n-D | d | D |
| HOST 10a-LUN-B | 13 | 75 | 3072 | 75×n-e | 3072×n-E | e | E |
| HOST 10b-LUN-C | 15 | 25 | 1024 | 25×n-f | 1024×n-F | f | F |

501

STORAGE DEVICE, AND STORAGE DEVICE CONTROL METHOD

CROSS-REFERENCE TO RELATED APPLICATION

This application is based upon and claims the benefit of priority of the prior Japanese Patent Application No. 2011-277726, filed on Dec. 19, 2011, the entire contents of which are incorporated herein by reference.

FIELD

The embodiments discussed herein are related to a storage device, a storage device control method, and a storage device control program.

BACKGROUND

Conventionally, in a storage system in which a plurality of servers shares one storage device, input/output processings requested by the servers compete in the storage device, and the input/output processings are not capable of providing stable performance in some cases.

Hence, the storage device has a QoS (Quality of Service) function of maintaining adequate performance according to a priority order per input/output processing by performing processing by assigning the priority order to processing requests from the servers.

As the QoS function of the storage device, a technique of allocating internal resources such as queues based on the priority specified by the server and processing commands is known. A case will be described as an example where a server A specifies the priority and transmits commands in a storage system in which two of the server A and a server B share a storage device.

When the server A specifies the priority, the storage device allocates, for example, three times of internal resources compared to processing for which the priority is not specified. As a result, the storage device executes input/output processing requested by the server A preferentially over input/output processing requested by the server B.

Further, a technique of maintaining adequate performance according to the priority order per application by setting target performance and performance limit per server or LUN (Logical Unit Number) at a storage device side is known.

Patent Document 1: Japanese Laid-open Patent Publication No. 2007-264751
Patent Document 2: Japanese Laid-open Patent Publication No. 2003-124976

However, the above related techniques are not capable of easily realizing the QoS function of the storage in some cases.

More specifically, when the server A specifies the priority and transmits the command, the storage device allocates relative performance per server. In other words, the priority depends on the number of servers which share the storage device, and therefore it is not possible to allocate absolute resources.

Hence, when the number of servers which share the storage device increases, even if the server A specifies the priority and transmits the command, resources allocated to processing of the server A by the storage device decreases. Further, in this case, dedicated software for collaborating the storage device and the servers is also needed.

Further, when the storage device side sets target performance and a performance limit per server or LUN, only servers of higher priority occupy resources and servers of lower priority are not capable of executing processing in some cases. Furthermore, in this case, setting a specific performance value per server or LUN is troublesome.

SUMMARY

According to an aspect of the embodiments, a storage device includes a memory; and a processor coupled to the memory, wherein the processor executes a process comprising: calculating an upper limit value of the number of input/output processings determined based on priority set to an information processing device, a port that is an interface between the information processing device and the storage device and a memory device of the storage device; scheduling an execution order of input/output processings based on the number of input/output processings received from the information processing device and the calculated upper limit value; and executing the input/output processings in the scheduled execution order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view illustrating an example of a correspondence between a priority order and a performance value;

FIG. 5 is a view illustrating an example of a QoS management table;

DESCRIPTION OF EMBODIMENTS

Preferred embodiments of the present invention will be explained with reference to accompanying drawings. In addition, these embodiments by no means limit the present invention. Further, the embodiments can be adequately combined to such an extent that processing content does not contradict.

[a] First Embodiment

Configuration of Storage System according to First Embodiment

Figure 1:
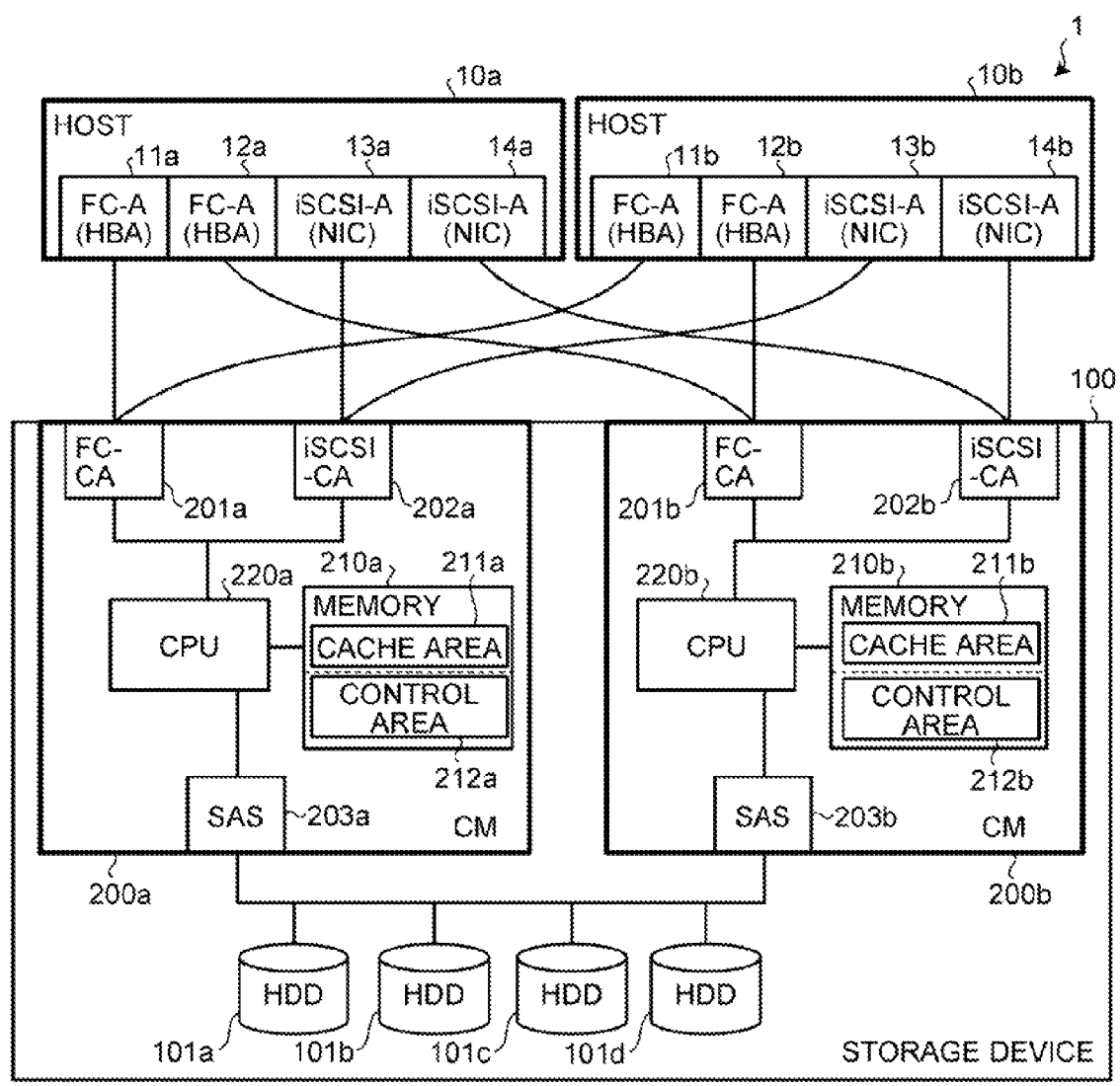
FIG. 1 is a view illustrating an example of a hardware configuration of a storage system according to a first embodiment.

FIG. 1 is a view illustrating an example of a configuration of a storage system according to a first embodiment. As illustrated in FIG. 1, a storage system 1 has a host 10a, a host 10b and a storage device 100. Further, in the storage system 1, the storage device 100 is connected with the host 10a and the host 10b. In addition, the number of hosts connected with the storage device 100 is not limited to an exemplary one, and can be changed.

Configuration of Host

Next, configurations of the host 10a and the host 10b will be described using FIG. 1. The host 10a and the host 10b are information processing devices such as servers. The host 10a has a FC (Fibre Channel)-A (Adapter) 11a, a FC-A 12a, an iSCSI (Small Computer System Interface)-A 13a and an iSCSI-A 14a. The FC-A generally adopts a FC-HBA (Host Bus Adapter) mode, and the iSCSI-A generally adopts a mode of using a NIC (Network Interface Card) and then operating an iSCSI protocol.

The FC-A 11a is an interface which is connected with a FC-CA 201a in a CM (Controller Module) 200a which will be described below, through a FC. Further, similarly, the FC-A 12a is an interface which is connected with a FC-CA 201b in CM 200b which will be described below, through the FC. Furthermore, the iSCSI-A 13a is an interface which is connected with an iSCSI-CA 202a in the CM 200a which will be described below, through an iSCSI. Similarly, the iSCSI-A 14a is an interface which is connected with an iSCSI-CA 202b in the CM 200b which will be described below, thorough the iSCSI.

The host 10b has a FC-A 11b, a FC-A 12b, an iSCSI-A 13b and an iSCSI-A 14b. The FC-A 11b corresponds to the FC-A 11a, and the FC-A 12b corresponds to the FC-A12a. Further, the iSCSI-A 13b corresponds to the iSCSI-A 13a, and the iSCSI-A 14b corresponds to the iSCSI-A 14a. In addition, the host 10a and the host 10b are generally referred to as a "host 10" without being distinguished.

Configuration of Storage Device according to First Embodiment

Next, a configuration of the storage device 100 according to the first embodiment will be described using FIG. 1. The storage device 100 according to the first embodiment has HDDs (Hard Disk Drive) 101a to 101d, and CMs 200a and 200b. The HDDs 101a to 101d configure a RAID (Redundant Arrays of Inexpensive Disks), and store user data. In addition, the numbers of HDDs and CMs of the storage device 100 are not limited to the illustrated ones, and can be changed. Further, the storage device 100 is used as LUNs logically divided from the HDDs 101a to 101d. These LUNs are respectively recognized as one logical HDD by the hosts 10a and 10b.

The CM 200a has the FC-CA 201a, the iSCSI-CA 202a, a SAS (Serial Attached SCSI) 203a, a memory 210a and a CPU (Central Processing Unit) 220a.

The FC-CA 201a is an interface which is connected with the host 10a and the host 10b through the FC. The iSCSI-CA 202a is an interface which is connected with the host 10a and the host 10b through the iSCSI. The SAS 203a is an interface which is connected with the HDDs 101a to 101d through a SAS. In addition, a FC-CA 201 and an iSCSI-CA 202 are generally referred to as a "port" adequately below.

The memory 210a is a semiconductor memory element such as a RAM, and has a cache area 211a and a control area 212a. The cache area 211a temporarily holds data exchanged between the host 10a or the host 10b, and one of the HDDs 101a to 101d. The control area 212a holds information which the storage device 100 needs to execute various processings. Further, various programs are also stored in the control area 212a.

The CPU 220a is an electronic circuit which performs various processings such as computation and control.

The CM 200b has the FC-CA 201b, the iSCSI-CA 202b, a SAS 203b, a memory 210b and a CPU220b. The FC-CA 201b corresponds to the FC-CA 201a, the iSCSI-CA 202b corresponds to the iSCSI-CA 202a and the SAS 203b corresponds to the SAS 203a. Further, the memory 210b corresponds to the memory 210a, and a CPU 220b corresponds to the CPU 220a.

In this storage system 1, the CPUs 220a and 220b of the storage device 100 execute the following processings using firmware. That is, the storage device 100 calculates an upper limit value of the number of input/output processings determined based on the priority set to the host 10, the port and the LUN per predetermined period of time. Further, the storage device 100 schedules an execution order of input/output processings based on the number of input/output processings received from the host 10 and the calculated upper limit value. Furthermore, the storage device 100 executes the scheduled input/output processing. Thus, the storage device 100 optimally controls storage performance according to a state of a host IO and a change of connection environment of a host.

Functional Configuration of Processing Unit Realized by Firmware

Figure 2:
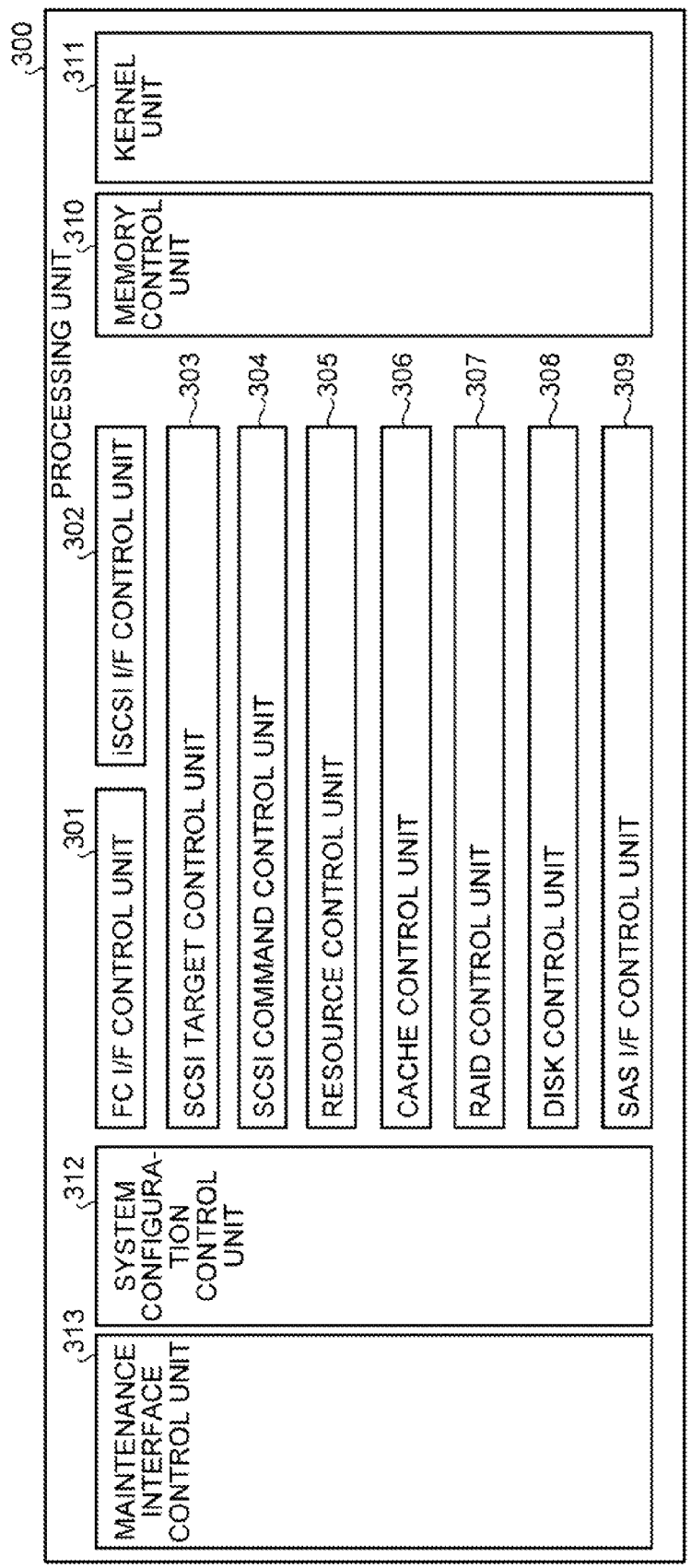
FIG. 2 is a functional block diagram illustrating a functional configuration of a processing unit which is realized by firmware executed by a storage device.

Next, a functional configuration of a processing unit which is realized by firmware executed by the storage device 100 will be described using FIG. 2. FIG. 2 is a functional block diagram illustrating the functional configuration of the processing unit which is realized by the firmware executed by the storage device. In addition, a processing unit 300 which is realized by the firmware executed by the storage device 100 is realized by collaboration of the memory 210a and the memory 210b, and the CPU 220a and the CPU 220b.

As illustrated in FIG. 2, the processing unit 300 has a FC I/F control unit 301, an iSCSI I/F control unit 302, a SCSI target control unit 303, a SCSI command control unit 304, a resource control unit 305, a cache control unit 306 and a RAID control unit 307. Further, the processing unit 300 has a disk control unit 308, a SAS I/F control unit 309, a memory control unit 310, a kernel unit 311, a system configuration control unit 312 and a maintenance interface control unit 313.

The FC I/F control unit 301 controls a FC protocol chip for connecting to the host through the FC. The iSCSI I/F control unit 302 controls the iSCSI protocol chip for connecting to the host thorough the iSCSI.

The SCSI target control unit 303 controls a SCSI target. For example, the SCSI target control unit 303 performs host management, LUN management, command execution management and abnormal event management other than commands. In addition, a detailed function of the SCSI target control unit 303 will be described later.

The SCSI command control unit 304 performs control per SCSI command type. The resource control unit 305 performs logical volume management, host path management and load management across all CMs. The cache control unit 306 manages a cache memory.

The RAID control unit 307 manages a RAID group. The disk control unit 308 controls disk commands. The SAS I/F control unit 309 controls a protocol chip for connecting to a disk through the SAS.

The memory control unit 310 manages a control memory used by each control unit. The kernel unit 311 is a base software unit, and is located at a lower class of each control unit. The system configuration control unit 312 manages configuration information of the storage device 100. The maintenance interface control unit 313 controls a maintenance user interface.

Figure 3:
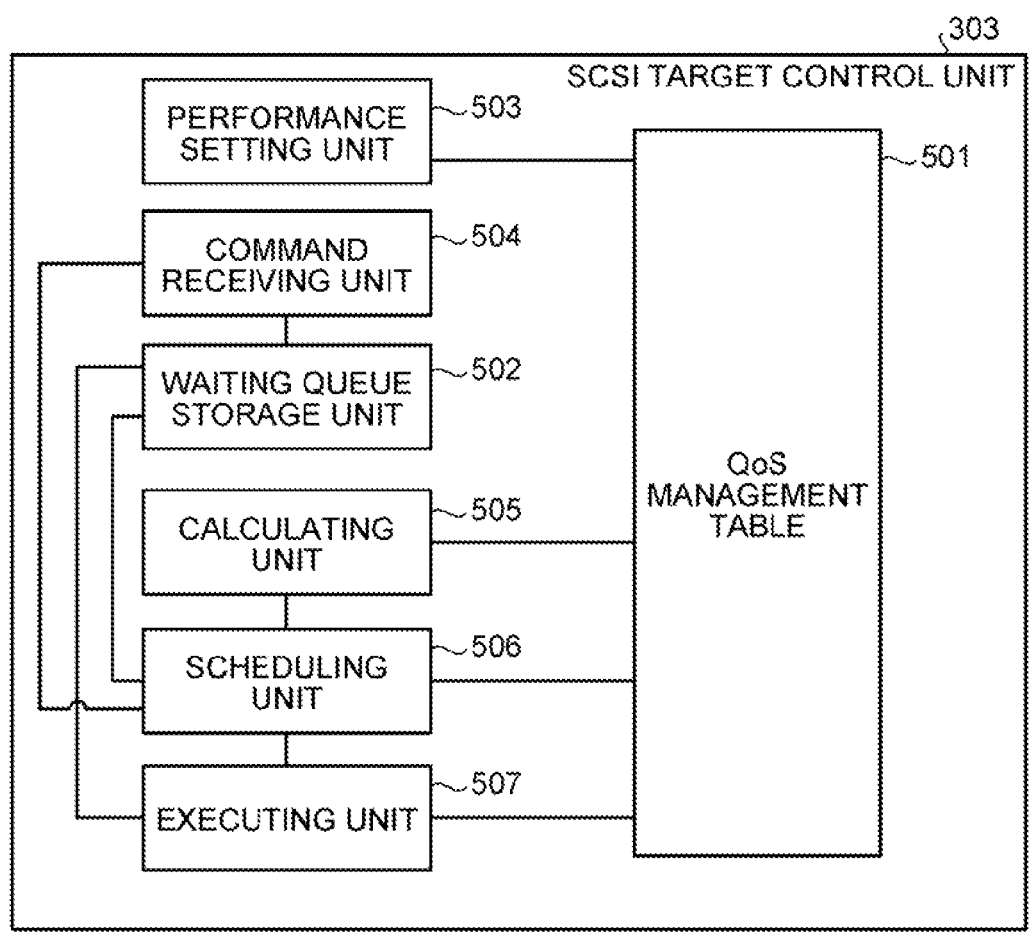
FIG. 3 is a functional block diagram illustrating a functional configuration of a SCSI target control unit according to the first embodiment.

Functional Configuration of SCSI Target Control Unit according to First Embodiment Next, a functional configuration of the SCSI target control unit 303 will be described using FIG. 3. FIG. 3 is a functional block diagram illustrating the functional configuration of the SCSI target control unit. As illustrated in FIG. 3, the SCSI target control unit 303 has a QoS management table 501, a waiting queue storage unit 502, a performance setting unit 503, a command receiving unit 504, a calculating unit 505, a scheduling unit 506 and an executing unit 507.

The QoS management table 501 stores information which associates "priority order", "performance value", the number of executable input/output processings and the number of executed input/output processings per target. Before the QoS management table 501 will be described in detail, the correspondence between "priority order" and "performance value" will be first described using FIG. 4.

FIG. 4 is a view illustrating an example of the correspondence between the priority order and the performance value. As illustrated in FIG. 4, "priority order" indicates the priority, and is set 15 levels from 1 to 15. In addition, a priority order level is only exemplary one, and is not limited to 15 levels from 1 to 15.

Further, "performance value" is associated per level of "priority order". In other words, "priority order" indicates a performance limit. For this "performance value", (MB/s) which is the amount of communication per unit time and an IOPS (Input Output Per Second) which is the number of executable input/output processings per unit time are used.

With an example illustrated in FIG. 4, when "priority order" is set to "1", the amount of communication per unit time is "750 (MB/s)", and this means "37500" input/output processings are executed per unit time. Further, similarly, when "priority order" is set to "3", the amount of communication per unit time is "650 (MB/s)", and this means that "32500" input/output processings are executed per unit time.

Next, an example of the QoS management table 501 will be described using FIG. 5. FIG. 5 is a view illustrating an example of the QoS management table. As illustrated in FIG. 5, the QoS management table 501 stores information which associates "target", "priority order", "the number of N millisecond IOs", "the number of N millisecond blocks", "the number of limit IOs", "the number of limit blocks", "the number of current IOs" and the number of current blocks".

Meanwhile, "target" stored in the QoS management table 501 indicates a target to which the priority order is set. Meanwhile, "port", "host" and "a combination of the host and the LUN" are targets to which priority orders are set. For example, "FC-CA 201a", "host 10a" and "host 10a-LUN-A" are stored in "target". In addition, "the combination of the host and the LUN" which will be described below as "target" will be referred to simply as "LUN".

"Priority order" indicates the priority set to the target. Meanwhile, one of 15 levels from 1 to 15 is set as the priority order level. For example, levels such as "3", "5" and "7" are stored in "priority order".

"The number of N millisecond IOs" indicates the number of IOs which can be executed during a predetermined period of time. Meanwhile, for example, 10 milliseconds are set as the predetermined period of time. Further, values such as "325", "275" and "225" are stored in "the number of NB millisecond IOs".

"The number of N millisecond blocks" indicates the number of writable blocks during the predetermined period of time. This number of blocks is calculated from the amount of communication (MB/s) per unit time assuming that one block is 512 Bytes. In addition, for example, 10 milliseconds are set as the predetermined period of time. That is, values such as "13312", "11264" and "9216" are stored in "the number of N millisecond blocks" as the number of writable blocks in 10 milliseconds.

"The number of limit IOs" indicates an upper limit value of the number of executable IOs at the current point of time. This number of limit IOs is calculated by subtracting "the number of current IOs" which will be described below, from a value obtained by multiplying "the number of N millisecond IOs" with "the number of times N milliseconds pass (n)". For example, values such as "325×n–a", "275×n–b" and "225×n–c" are stored in "the number of limit IOs". In addition, "n" indicates "the number of times N milliseconds pass", and "a" to "c" correspond to values of "the number of current IOs" as described below.

"The number of limit blocks" indicates an upper limit value of the number of writable blocks at the current point of time. This number of limit blocks is calculated by subtracting "the number of current blocks" which will be described below, from a value obtained by multiplying "the number of N millisecond blocks" with "the number of times N milliseconds pass (n)". For example, values such as "13312×n–A", "11264×n–B" and "9216×n–C" are stored in "the number of limit blocks". In addition, "n" is "the number of times N milliseconds pass", and "A" to "C" correspond to values of "the number of current blocks" as described below.

"The number of current IOs" indicates a cumulative value of the number of IOs requested by the predetermined period of time. For example, "a", "b" and "c" are stored in "the number of current IOs". "The number of current blocks" indicates a cumulative value of the number of blocks requested by the predetermined period of time. For example, "A", "B" and "C" are stored in "the number of current blocks".

With an example illustrated in FIG. 5, the QoS management table 501 indicates that the priority order of "port" is "3", "the number of N millisecond IOs" is "325" and "the number of N millisecond blocks" is "13312". Further, the QoS management table 501 indicates that "the number of limit IOs" is "325×n–a", "the number of limit blocks" is "13312×n–A", "the number of current IOs is "a", and "the number of current blocks" is "A".

In addition, "target", "priority order", "the number of N millisecond IOs" and "the number of N millisecond blocks" stored in the QoS management table 501 are values set as default by the performance setting unit 503 which will be described below. Further, "the number of limit IOs", "the number of limit blocks", "the number of current IOs" and "the number of current blocks" stored in the QoS management table 501 are values updated every N millisecond.

The waiting queue storage unit 502 stores commands which are queues and which are scheduled after the predetermined period of time passes among commands received by the command receiving unit 504. Further, this waiting queue storage unit 502 is provided per combination of the host and the LUN.

The performance setting unit 503 sets values received from an administrator, respectively to "target", "priority order", "the number of N millisecond IOs" and "the number of N millisecond blocks" among information stored in the QoS management table 501. In addition, the administrator sets the priority order taking performance of the host and an application executed by the host into account.

Further, when a combination of the host connected to the storage device 100 and an LUN used by the host changes, the performance setting unit 503 updates information stored in the QoS management table 501.

The command receiving unit 504 receives a command from one of hosts, and determines whether or not there is a command waiting to be executed. For example, when determining that there is a command waiting to be executed, the command receiving unit 504 stores the received command in the waiting queue storage unit 502. Further, when determining that there is no command waiting to be executed, the command receiving unit 504 has the scheduling unit 506 which will be described below schedule an execution order of the received command.

The calculating unit 505 calculates per predetermined period of time the number of limit IOs and the number of limit blocks determined based on the priority order set to each of the host 10, the port and the LUN. Hereinafter, the calculating unit 505 is assumed to calculate the number of limit IOs and the number of limit blocks every 10 millisecond.

For example, the calculating unit 505 adds the number of N millisecond IOs to a value of the number of limit IOs every 10 millisecond. Further, the calculating unit 505 adds the number of N millisecond blocks to a value of the number of limit blocks every 10 millisecond. The calculating unit 505 has the QoS management table 501 store the calculated number of limit IOs and number of limit blocks.

The scheduling unit 506 schedules an execution order of commands based on the number of commands received from the host and the number of limit IOs and the number of limit blocks calculated by the calculating unit 505. For example, the scheduling unit 506 schedules the execution order of the commands every time the period of predetermined time passes.

The scheduling unit 506 restores a marked host and a marked LUN. Further, the scheduling unit 506 executes the following processing in order from a combination of the restored host and LUN. In addition, marking a host and marking an LUN will be described below.

First, the scheduling unit 506 determines whether or not the number of commands received from the host is within the number of limit IOs and the number of limit blocks of each of the host, the port and the LUN calculated by the calculating unit 505, and it is possible to process the commands. Meanwhile, when determining that the number of received commands is within the number of limit IOs and the number of limit blocks and it is possible to process the commands, the scheduling unit 506 has the executing unit 507 activate the commands.

Further, when determining that it is possible to process the commands, the scheduling unit 506 has the QoS management table 501 store a value obtained by adding the number of IOs corresponding to the activated commands, to "the number of current IOs" stored in the QoS management table 501. Similarly, when determining that it is possible to process the commands, the scheduling unit 506 has the QoS management table 501 store a value obtained by adding the number of blocks corresponding to the activated commands, to "the number of current blocks" stored in the QoS management table 501.

Further, when determining that it is possible to process the commands, the scheduling unit 506 has the QoS management table 501 store a value obtained by subtracting the number of IOs corresponding to the activated commands, from "the number of limit IOs" stored in the QoS management table 501. Similarly, when determining that it is possible to process the commands, the scheduling unit 506 has the QoS management table 501 store a value obtained by subtracting the number of blocks corresponding to the activated commands, from "the number of limit blocks" stored in the QoS management table 501.

Meanwhile, when determining that the number of received commands is not within the number of limit IOs and the number of limit blocks, the scheduling unit 506 determines after the predetermined period of time passes whether or not the number of commands received from the host is within the number of limit IOs and the number of limit blocks which are newly calculated.

When, for example, determining that the number of received commands is not within the number of limit IOs and the number of limit blocks of the port, the scheduling unit 506 marks a combination of a host and an LUN, and schedules the combination of the marked host and LUN after the predetermined period of time passes. Further, when, for example, determining that the number of commands is within the number of limit IOs and the number of limit blocks of the port and is not within the number of limit IOs and the number of limit blocks of the host, the scheduling unit 506 marks the LUN. Furthermore, the scheduling unit 506 sets the next LUN, and determines whether or not the number of commands received from the host is within the number of limit IOs and the number of limit blocks which are newly calculated. Meanwhile, when there is no next LUN, the scheduling unit 506 sets the next host, and determines whether or not the number of received commands is within the number of limit IOs and the number of limit blocks which are newly calculated.

Further, when the command receiving unit 504 determines that there is no command waiting to be executed, the scheduling unit 506 schedules an execution order of the commands without waiting for the predetermined period of time to pass. For example, the scheduling unit 506 determines whether or not the number of commands received from the host is within the number of limit IOs and the number of limit blocks of each of the host, the port and the LUN calculated by the calculating unit 505, and it is possible to process the commands. Meanwhile, when determining the number of commands received from the host is within the number of limit IOs and the number of limit blocks of one of the port, the host and the LUN and it is not possible to process the commands, the commands are stored in the waiting queue storage unit 502. Further, the scheduling unit 506 determines after the predetermined period of time passes whether or not the number of commands received from the host is within the number of limit IOs and the number of limit blocks which are newly calculated.

The executing unit 507 dequeues the commands from the waiting queue storage unit 502 according to the execution order scheduled by the scheduling unit 506, activates the commands and executes input/output processings.

In addition, each function of the SCSI target control unit 303 is realized by collaborating the memory 210*a* and the memory 210*b*, and the CPU 220*a* and the CPU 220*b*.

Procedure of Processing of Storage Device According to First Embodiment

Next, a procedure of processing of the storage device 100 according to the first embodiment will be described using FIGS. 6 to 8. Hereinafter, a procedure of N millisecond timer schedule processing will be described using FIG. 6, a procedure of QoS IO schedule processing will be described using FIG. 7, and a procedure of processing when the storage device 100 receives commands will be described using FIG. 8.

N Millisecond Timer Schedule Processing

Figure 6:
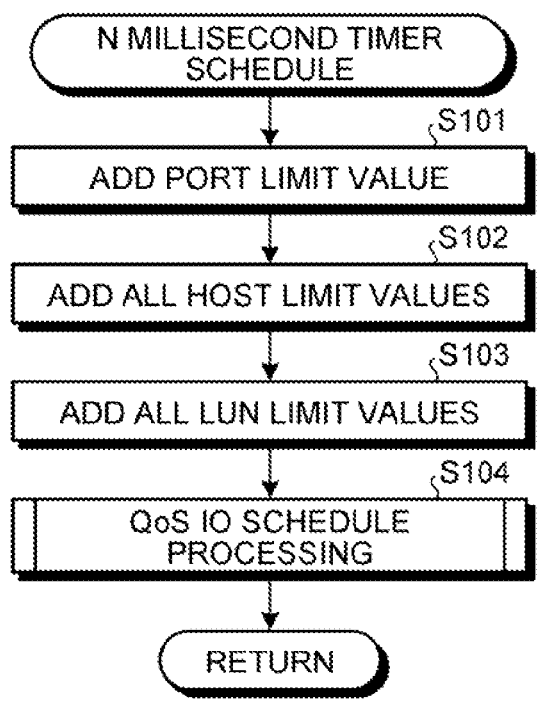
FIG. 6 is a flowchart illustrating a procedure of N millisecond timer schedule processing according to the first embodiment.

FIG. 6 is a flowchart illustrating the procedure of the N millisecond timer schedule processing. As illustrated in FIG. 6, the calculating unit 505 adds a port limit value (step S101). Further, the calculating unit 505 adds all host limit values (step S102). Furthermore, the calculating unit 505 adds all LUN limit values (step S103). Still further, the scheduling unit 506 executes the QoS IO schedule processing (step S104).

QoS IO Schedule Processing

Figure 7:
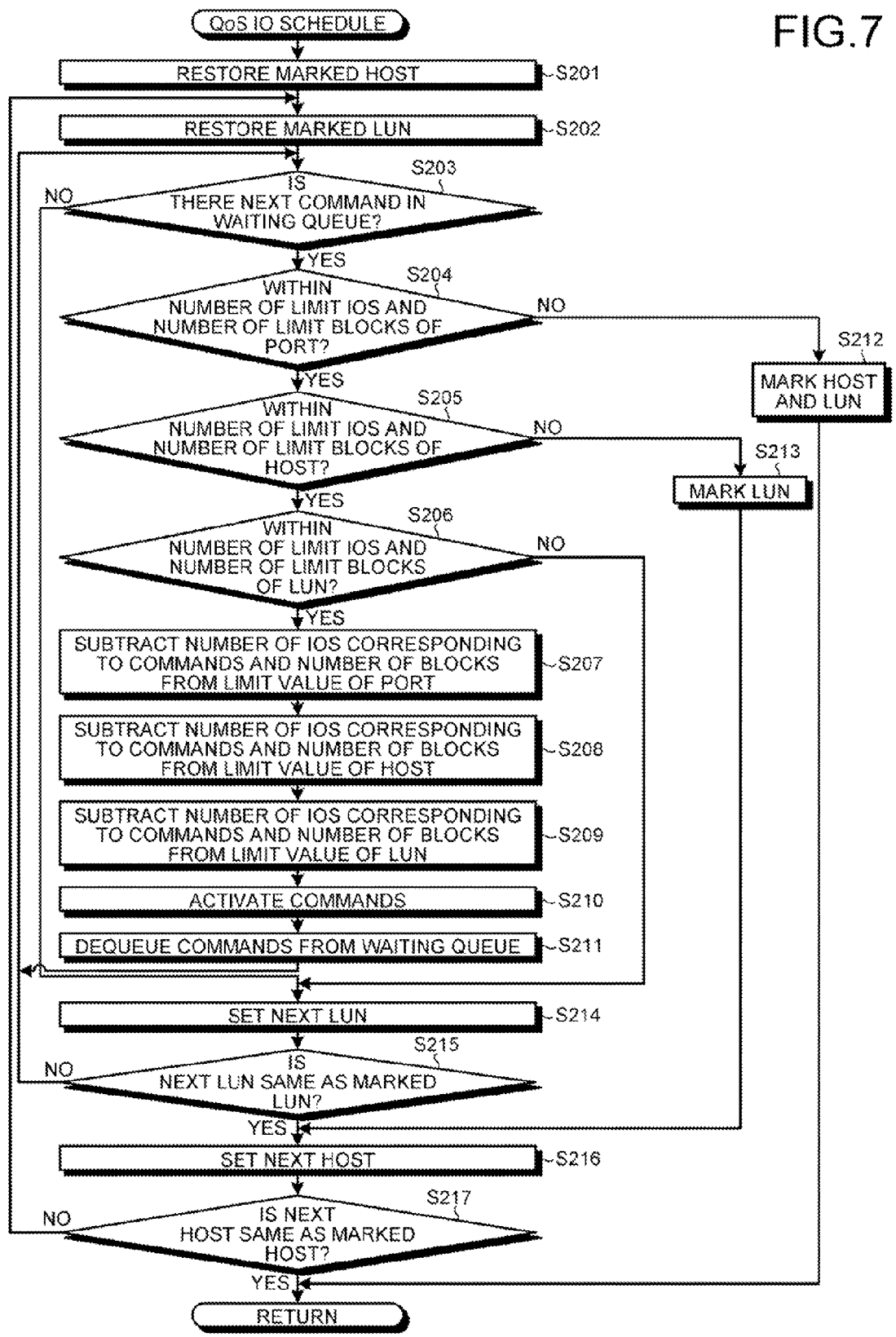
FIG. 7 is a flowchart illustrating a procedure of QoS IO schedule processing according to the first embodiment.

FIG. 7 is a flowchart illustrating the procedure of the QoS IO schedule processing. Details of processing in step S104 of the N millisecond timer schedule processing will be described.

As illustrated in FIG. 7, the scheduling unit 506 restores the marked host (step S201). Subsequently, the scheduling unit 506 restores the marked LUN (step S202). Further, the scheduling unit 506 determines whether or not there is the next command in the waiting queue storage unit 502 (step S203).

Meanwhile, when determining that there is the next command in the waiting queue storage unit 502 (Yes in step S203), the scheduling unit 506 determines whether or not the number of commands is within the number of limit IOs and the number of limit blocks of the port (step S204). Further, when determining that the number of commands is within the number of limit IOs and the number of limit blocks of the port (Yes in step S204), the scheduling unit 506 determines whether or not the number of commands is within the number of limit IOs and the number of limit blocks of the host (step S205).

Meanwhile, when determining that the number of commands is within the number of limit IOs and the number of limit blocks of the host (Yes in step S205), the scheduling unit 506 determines whether or not the number of commands is within the number of limit IOs and the number of limit blocks of the LUN (step S206). Further, when determining that the number of commands is within the number of limit IOs and the number of limit blocks of the LUN (Yes in step S206), the scheduling unit 506 subtracts the number of IOs corresponding to the commands and the number of blocks, from the limit value of the port (step S207).

Furthermore, the scheduling unit 506 subtracts the number of IOs corresponding to the commands and the number of blocks from the limit value of the host (step S208). Subsequently, the scheduling unit 506 subtracts the number of IOs corresponding to the commands and the number of blocks from the limit value of the LUN (step S209). Further, the executing unit 507 activates the commands (step S210). Furthermore, after activating the commands, the executing unit 507 dequeues the commands from the waiting queue storage unit 502 (step S211). After this processing, the storage device 100 proceeds to step S203.

Further, when determining that the number of commands is not within the number of limit IOs and the number of limit blocks of the port (No in step S204), the scheduling unit 506 marks the host and the LUN (step S212), and finishes processing. Furthermore, when determining that the number of commands is not within the number of limit IOs and the number of limit blocks of the host (No in step S205), the scheduling unit 506 marks the LUN (step S213) and proceeds to step S216.

Still further, when determining that there is no next command in the waiting queue storage unit 502 (No in step S203), the scheduling unit 506 proceeds to step S214. Moreover, when determining that the number of commands is not within the number of limit IOs and the number of limit blocks of the LUN (No in step S206), the scheduling unit 506 proceeds to step S214.

In step S214, the scheduling unit 506 sets the next LUN. Further, the scheduling unit 506 determines whether or not the next LUN is the same as the marked LUN (step S215). Meanwhile, when determining that the next LUN is not the same as the marked LUN (No in step S215), the scheduling unit 506 proceeds to step S203.

Meanwhile, when determining that the next LUN is the same as the marked LUN (Yes in step S215), the scheduling unit 506 sets the next host (step S216). Subsequently, the scheduling unit 506 determines whether or not the next host is the same as the marked host (step S217). Meanwhile, when determining that the next host is not the same as the marked host (No in step S217), the scheduling unit 506 proceeds to step S202. On the other hand, when determining that the next host is the same as the marked host (Yes in step S217), the scheduling unit 506 finishes processing.

Processing upon Reception of Command

Figure 8:
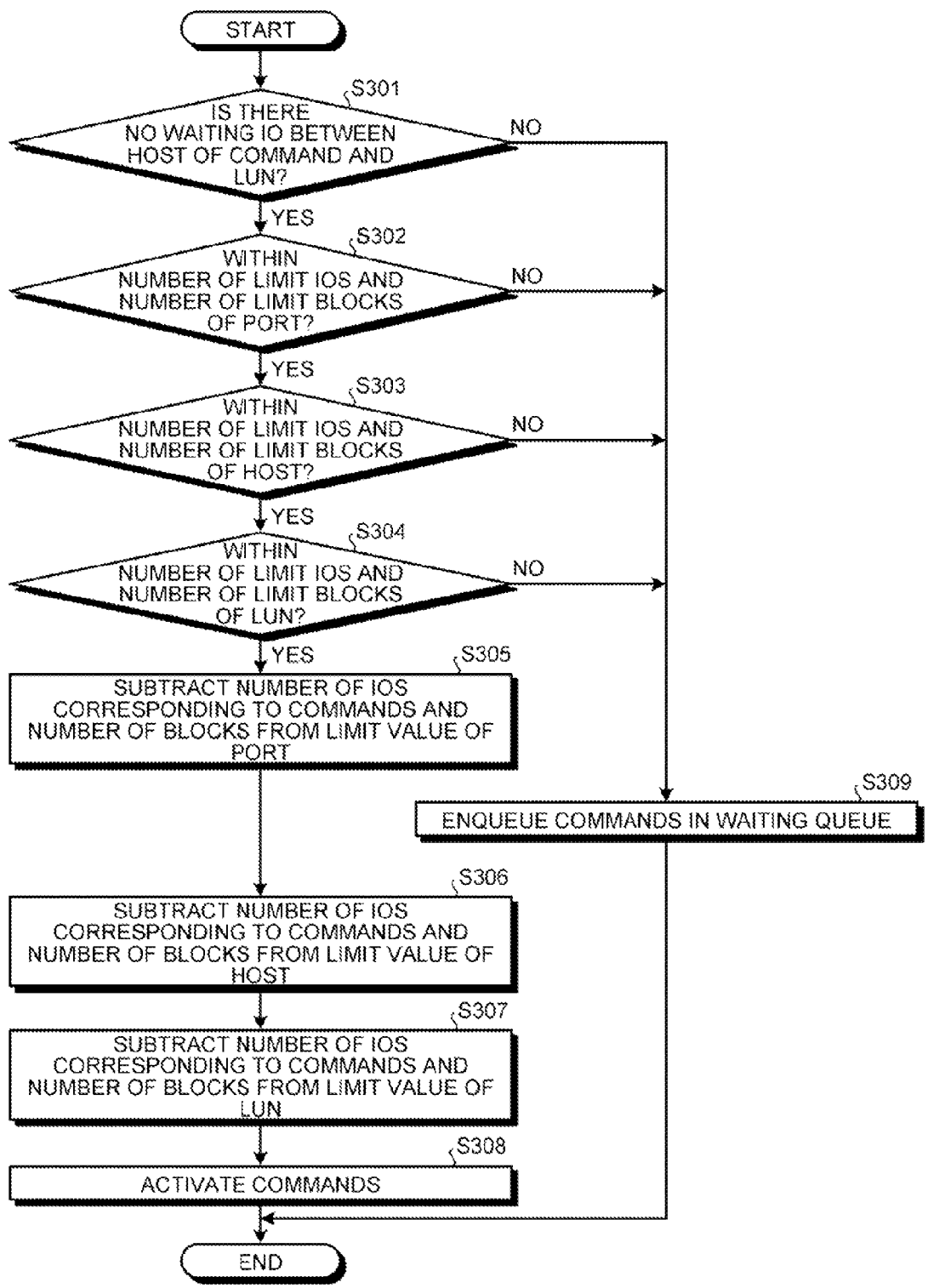
FIG. 8 is a flowchart illustrating a procedure of processing when the storage device receives commands according to the first embodiment.

FIG. 8 is a flowchart illustrating a procedure of processing when the storage device receives a command. The storage device 100 executes this processing upon, for example, reception of a command.

As illustrated in FIG. 8, the command receiving unit 504 determines whether or not there is a waiting IO between the host of the received command and the LUN (step S301). Meanwhile, when the command receiving unit 504 determines that there is no waiting IO between the host of the received command and the LUN (Yes in step S301), the scheduling unit 506 executes the following processing. That is, the scheduling unit 506 determines whether or not the number of commands is within the number of limit IOs and the number of limit blocks of the port (step S302). Further, when determining that the number of commands is within the number of limit IOs and the number of limit blocks of the port (Yes in step S302), the scheduling unit 506 determines whether or not the number of commands is within the number of limit IOs and the number of limit blocks of the host (step S303).

Meanwhile, when determining that the number of commands is within the number of limit IOs and the number of limit blocks of the host (Yes in step S303), the scheduling unit 506 determines whether or not the number of commands is within the number of limit IOs and the number of limit blocks of the LUN (step S304). Further, when determining that the number of commands is within the number of limit IOs and the number of limit blocks of the LUN (Yes in step S304), the scheduling unit 506 subtracts the number of IOs corresponding to the commands and the number of blocks, from the limit value of the port (step S305).

Furthermore, the scheduling unit 506 subtracts the number of IOs corresponding to the commands and the number of blocks from the limit value of the host (step S306). Subsequently, the scheduling unit 506 subtracts the number of IOs corresponding to the commands and the number of blocks from the limit value of the LUN (step S307). Further, the executing unit 507 activates the commands (step S308). The storage device 100 finishes processing after step S308 is finished.

When determining that there is a waiting IO between the host of the received command and the LUN (No in step S301), the command receiving unit 504 proceeds to step S309. Further, when determining that the number of commands is not within the number of limit IOs and the number of limit blocks of the port (No in step S302), the scheduling unit 506 proceeds to step S309. Furthermore, when determining that the number of commands is not within the number of limit IOs and the number of limit blocks of the host (No in step S303), the scheduling unit 506 proceeds to step S309. Still further, when the number of commands is not within the number of limit IOs and the number of limit blocks of the LUN (No in step S304), the scheduling unit 506 proceeds to step S309. Moreover, the command receiving unit 504 enqueues the commands to the waiting queue storage unit 502 in step S309, and finishes processing.

Effect of First Embodiment

Figure 9:
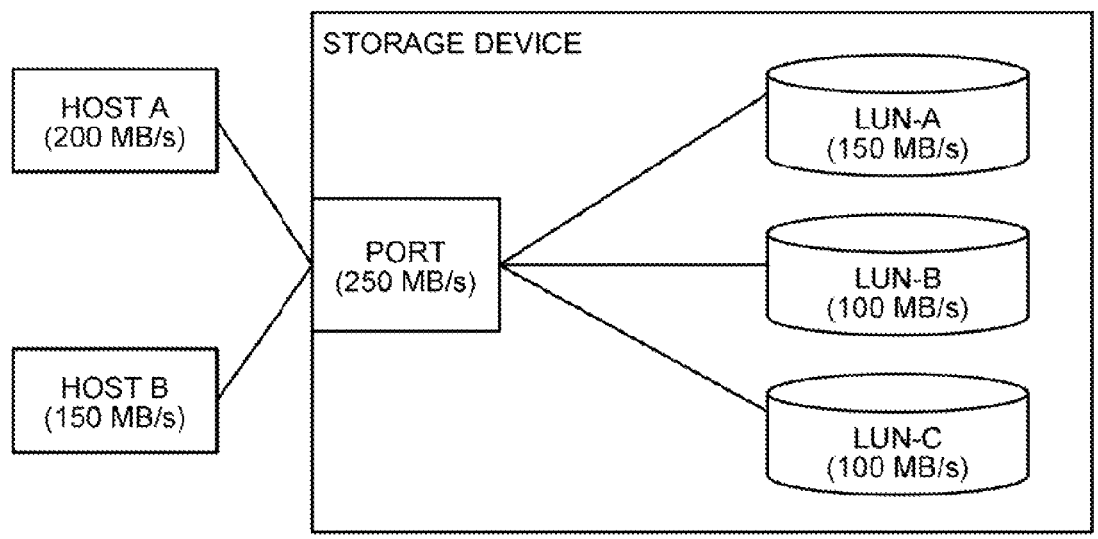
FIG. 9 is a view illustrating an example of an effect of the storage device according to the first embodiment.

Thus, the storage device 100 according to the first embodiment can easily realize the QoS function of the storage. Next, an example of an effect of the storage device 100 according to the first embodiment will be described using FIG. 9. FIG. 9 is a view illustrating an example of the effect of the storage device according to the first embodiment. A case will be described with an example illustrated in FIG. 9 where a host A can access an LUN-A and an LUN-B and a host B can access an LUN-C. Meanwhile, it is assumed that a performance limit of the host A is 200 (MB/s) and a performance limit of the host B is 150 (MB/s). Further, it is also assumed that a performance limit of the LUN-A is 150 (MB/s), a performance limit of the LUN-B is 100 (MB/s), a performance limit of an LUN-C is 100 (MB/s) and a performance limit of the port is 250 (MB/s).

A case will be described first where only the host A uses only the LUN-A at the amount of communication of 150 (MB/s). This amount of communication reaches none of 150 (MB/s) which is performance of the LUN-A, 200 (MB/s) which is the performance limit of the host A and 250 (MB/s) which is the performance limit of the port. Hence, the scheduling unit 506 schedules the received commands up to the performance limit without waiting for the predetermined period of time. As a result, the storage device 100 can process an access from the host A to the LUN-A at 150 (MB/s).

Next, a case will be described where only the host A uses the LUN-A at the amount of communication of 150 (MB/s) and uses the LUN-B at the amount of communication of 100 (MB/s). Although the sum of these amounts of communication reaches none of 150 (MB/s) which is the performance of the LUN-A, 100 (MB/s) which is the performance of the LUN-B and 250 (MB/s) which is the performance limit of the port, the sum exceeds 200 (MB/s) which is the performance limit of the host A. Hence, some commands received from the host A are scheduled on the spot, and some commands are stored in the waiting queue storage unit 502 and then are scheduled by the scheduling unit 506 according to N millisecond timer scheduling.

As a result, the performances of the LUN-A and the LUN-B are limited substantially as follows. The host A accesses the LUN-A at 200 (MB/s)×150/(150 +100)=120 (MB/s), and the host A accesses the LUN-B at 200 (MB/s)× 100/(150+100)=80 (MB/s).

Next, a case will be described where the host A uses the LUN-A at the amount of communication of 150 (MB/s) and uses the LUN-B at the amount of communication of 100 (MB/s), and the host B uses the LUN-C at the amount of communication of 100 (MB/s). 350 (MB/s) which is the total sum of these amounts of communication exceeds 250 (MB/s) which is the performance limit of the port. Hence, some commands received from the host A and the host B are scheduled on the spot, and some commands are stored in the waiting queue storage unit 502 and are scheduled by the scheduling unit 506 according to N millisecond timer scheduling.

As a result, the storage device 100 executes the processing according to, for example, each performance which is roughly described below. That is, the host A accesses the LUN-A at 250 (MB/s)×150/(150+100+100)=107 (MB/s). Further, the host A accesses the LUN-B at 250 (MB/s)×100/(150+100+100)=71 (MB/s). Furthermore, the host B accesses the LUN-C at 250 (MB/s)×100/(150+100+100)=71 (MB/s).

Thus, the storage device 100 according to the first embodiment allocates performance of the storage device 100 according to a performance level of a combination of a host and an LUN to be used and, consequently, can easily realize the QoS function of the storage.

[b] Second Embodiment

An example has been described with the first embodiment where performance of the storage device 100 is allocated according to a performance level based on a combination of a host and an LUN to be used. By the way, the storage device 100 uses only a specific host or a specific LUN in a given time zone. In view of above, allocation of performance may be dynamically adjusted according to a use situation of a host and an LUN.

Hence, a case will be described with a second embodiment where the storage device 100 changes a limit value in processing upon N millisecond timer scheduling. When, for example, detecting that actual performance of an I/O continues going below performance of an entire storage for a predetermined period of time, the storage device 100 upgrades a set performance level in an LUN in which the I/O is performed up to a limit.

Configurations of Storage System and Storage Device according to Second Embodiment A configuration of a storage system according to the second embodiment is the same as a configuration of a storage system according to the first embodiment illustrated in FIG. 1 except that a functional configuration of a SCSI target control unit is different in firmware executed by the storage device. Hence, the configuration of the storage system according to the second embodiment and the configuration of the storage device according to the second embodiment will not be described.

Figure 10:
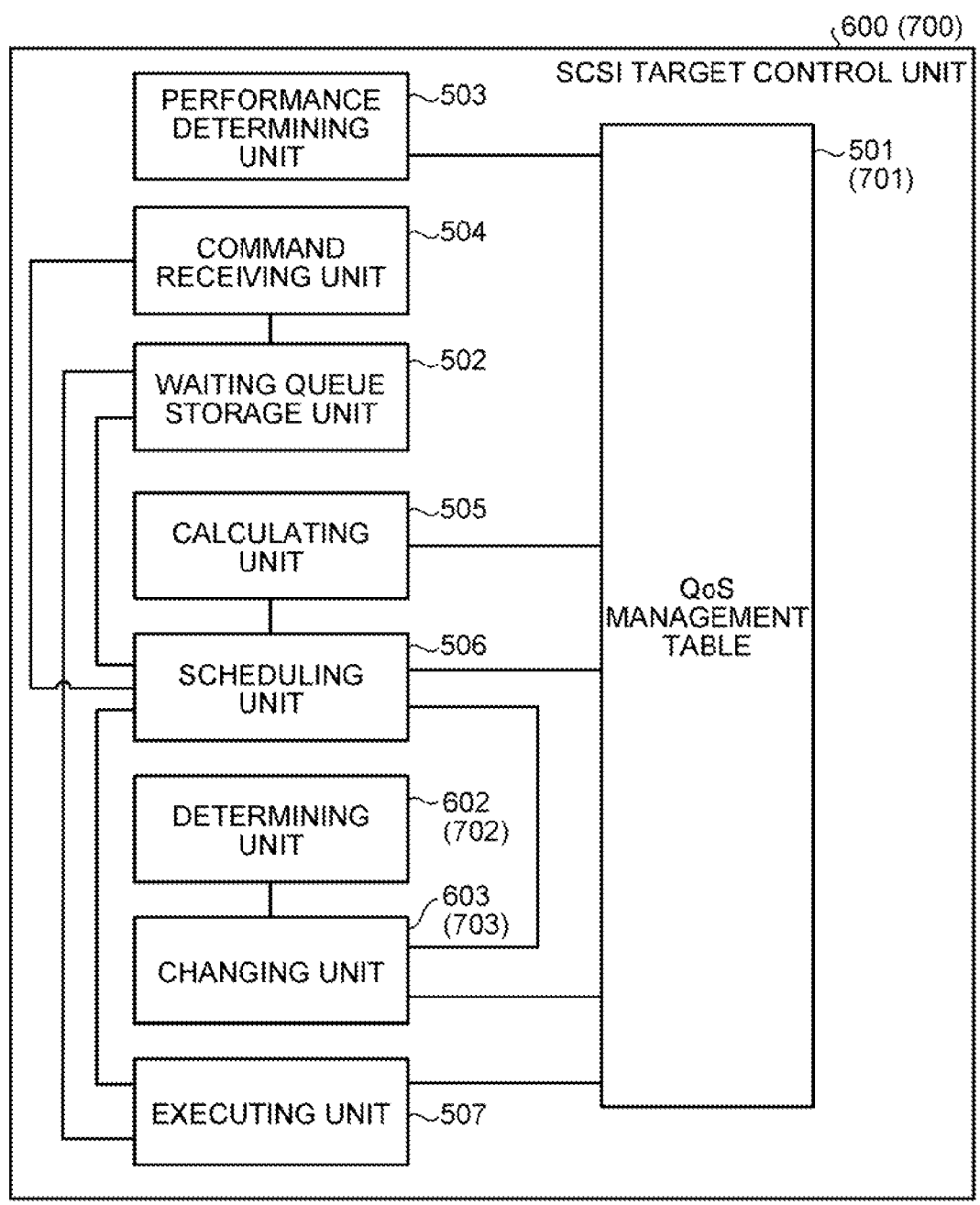
FIG. 10 is a functional block diagram illustrating a functional configuration of a SCSI target control unit according to a second embodiment.

Functional Configuration of SCSI Target Control Unit according to Second Embodiment Next, a functional configuration of the SCSI target control unit according to the second embodiment will be described using FIG. 10. FIG. 10 is a functional block diagram illustrating the functional configuration of the SCSI target control unit according to the second embodiment. In addition, the same configuration as in the SCSI target control unit according to the first embodiment will be denoted with the same reference numerals, and the explanation thereof will be omitted.

As illustrated in FIG. 10, a SCSI target control unit 600 according to the second embodiment has a QoS management table 501, a waiting queue storage unit 502, a performance setting unit 503, a command receiving unit 504, a calculating unit 505, a scheduling unit 506, an executing unit 507, a determining unit 602 and a changing unit 603.

The determining unit 602 determines whether or not a load state of input/output processing changes based on the number of execution of commands and entire performance of the storage device 100. In addition, the entire performance of the storage device 100 refers to physical performance of the storage device 100, and refers to a processing capacity of the storage device 100 such as a transfer rate of HDDs 101*a* to 101*d*, a RAID capacity and a CPU processing efficiency.

When the number of execution of commands continues going below the number of executable input/output processings based on the entire performance of the storage device 100 for a predetermined period of time, the determining unit 602 determines that the load state of specific input/output processing has changed.

For example, the determining unit 602 compares a transfer rate which an HDD originally has, and an actual write processing speed. Further, when, for the predetermined period of time, the actual write processing speed is continually slower than the transfer rate which the HDD originally has, the determining unit 602 determines that the entire performance of the storage device 100 is not exhibited. Meanwhile, the predetermined period of time is, for example, 30 seconds.

Subsequently, when determining that the state where the entire performance of the storage device 100 is not exhibited passes for 30 seconds or more, the determining unit 602 determines whether or not there is an LUN which has executed commands up to a limit of a performance value. When, for example, the number of limit IOs is close to 0 or the number of limit blocks is close to 0, the determining unit 602 determines that commands are executed up to a limit of a performance value. When determining that the number of limit IOs is close to 0 or the number of limit blocks is close to 0, the determining unit 602 notifies to the changing unit 603 that the priority order of an LUN which has executed the commands up to a limit of the performance value is increased by one level.

Further, the determining unit 602 notifies that the priority order is increased by one level, and then determines whether or not the number of execution of commands continues going below the number of executable input/output processing based on the entire performance of the storage device 100 for the predetermined period of time.

When determining that the determining unit 602 determines that a load state of input/output processing has changed, the changing unit 603 changes the priority order of a specific target LUN among priorities stored in the QoS management table 501. When, for example, the determining unit 602 determines that the load state of the specific input/output processings has changed, the changing unit 603 changes the priority order of the specific target LUN to a value which is, for example, one level higher than a set value. In addition, the level of the priority order upgraded by the changing unit 603 is not limited to one level, and may be upgraded by two levels.

Further, when the determining unit 602 determines that the number of execution of commands does not continue going below the number of executable input/output processings based on the entire performance of the storage device for the predetermined period of time, the changing unit 603 changes the priority order of the LUN for which the priority order has been increased by one level, back to a value before the change.

In addition, each function of the determining unit 602 and the changing unit 603 is realized by collaborating a memory 210*a* and a memory 210*b*, and a CPU 220*a* and a CPU 220*b*.

Procedure of Processing of Storage Device According to Second Embodiment

Next, a procedure of processing of the storage device 100 according to the second embodiment will be described using FIGS. 11 and 12. Meanwhile, a procedure of N millisecond timer schedule processing of the storage device 100 according to the second embodiment will be described using FIG. 11, and a procedure of limit value setting adjustment processing of the storage device 100 according to the second embodiment will be described using FIG. 12.

N Millisecond Timer Schedule Processing

Figure 11:
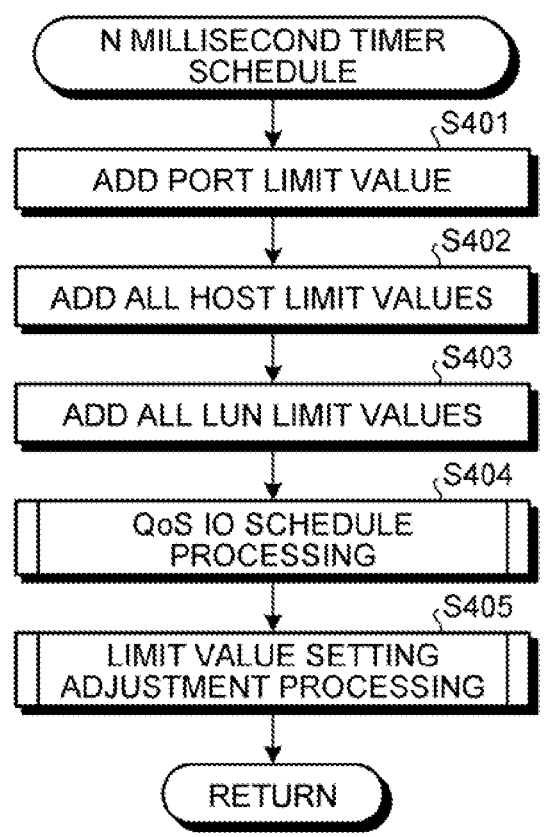
FIG. 11 is a flowchart illustrating a procedure of N millisecond timer schedule processing of a storage device according to the second embodiment.

FIG. 11 is a flowchart illustrating the procedure of the N millisecond timer schedule processing of the storage device according to the second embodiment. In addition, each processing of step S401 to step S404 illustrated in FIG. 11 corresponds to each processing of step S101 to step S104 illustrated in FIG. 6, and therefore will not be described. As illustrated in FIG. 11, the storage device 100 according to the second embodiment executes the limit value setting adjustment processing after step S404 is finished (step S405).

Limit Value Setting Adjustment Processing

Figure 12:
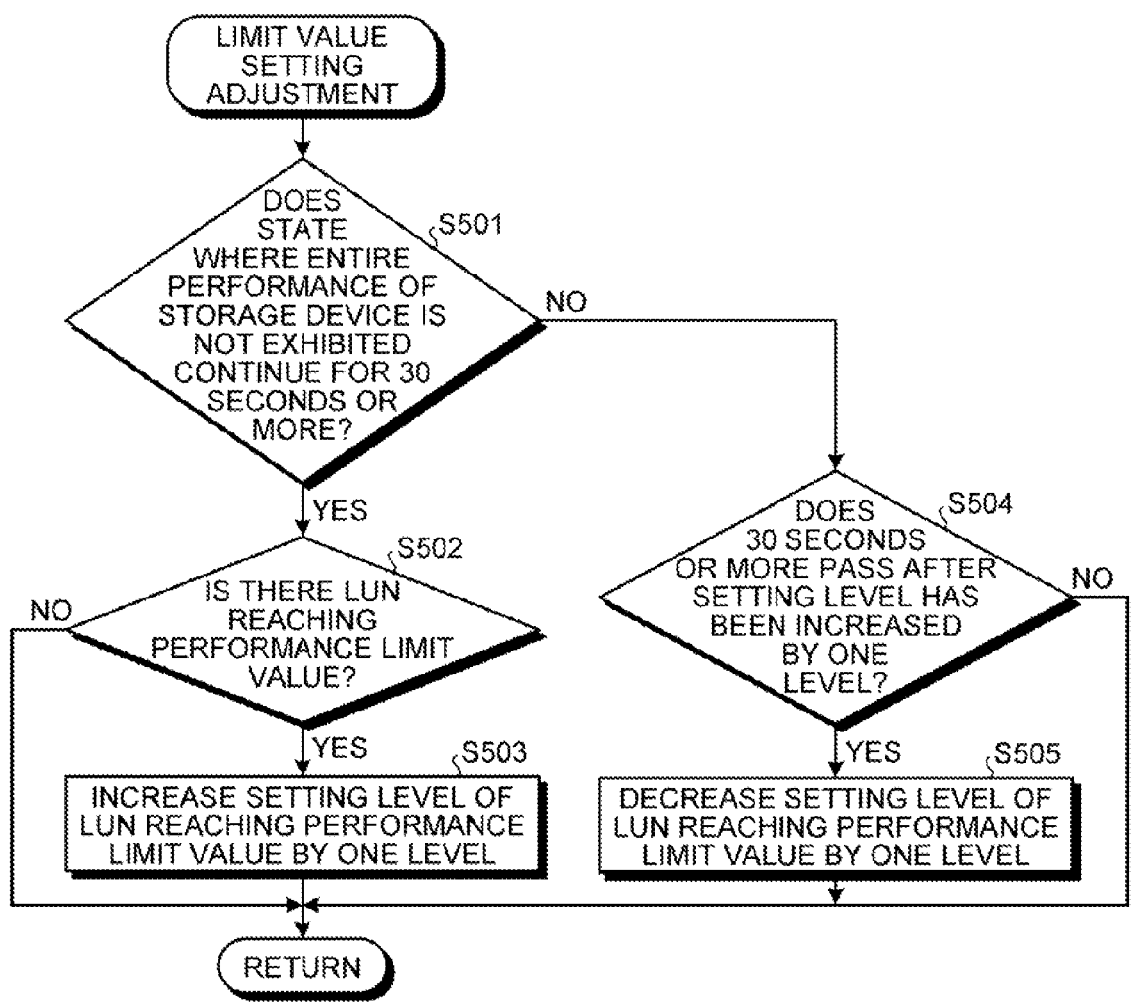
FIG. 12 is a flowchart illustrating a procedure of limit value setting adjustment processing of the storage device according to the second embodiment.

FIG. 12 is a flowchart illustrating a procedure of the limit value setting adjustment processing of the storage device according to the second embodiment.

As illustrated in FIG. 12, the determining unit 602 determines whether or not a state where the entire performance of the storage device 100 is not exhibited passes for 30 seconds or more (step S501). Meanwhile, when determining that the state where the entire performance of the storage device 100 is not exhibited has passed for 30 seconds or more (Yes in step S501), the determining unit 602 determines whether or not there is an LUN reaching a performance limit value (step S502).

Then, when the determining unit 602 determines that there is the LUN reaching the performance limit value (Yes in step S502), the changing unit 603 increases a setting level of the LUN reaching the performance limit value by one level (step S503), and finishes processing. Meanwhile, when determining that there is no LUN reaching the performance limit value (No in step S502), the determining unit 602 finishes processing.

Further, when determining that the state where the entire performance of the storage device 100 is not exhibited has not passed for 30 seconds or more (No in step S501), the determining unit 602 determines whether or not 30 seconds or more passes after the setting level is increased (step S504).

Then, when the determining unit 602 determines that 30 seconds or more has passed after the setting level is increased (Yes in step S504), the changing unit 603 decreases one level of the setting level of the LUN for which the setting level has been increased by one level (step S505), and finishes processing. Meanwhile, when determining that 30 seconds or more has not passed after the setting level is increased (No in step S504), the determining unit 602 finishes processing.

Effect According to Second Embodiment

Figure 13:
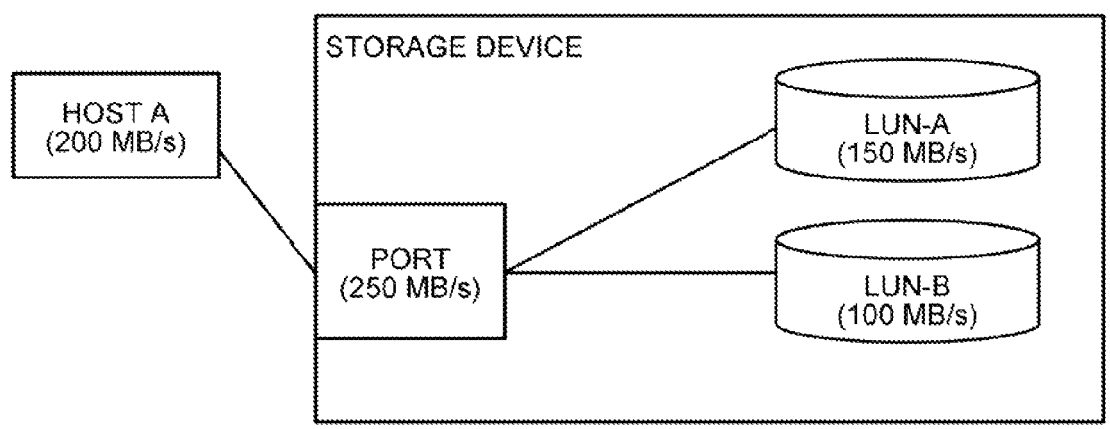
FIG. 13 is a view illustrating an example of an effect of the storage device according to the second embodiment.

Next, an effect of the storage device 100 according to the second embodiment will be described using FIG. 13. FIG. 13 is a view illustrating an example of the effect of the storage device according to the second embodiment. A case will be described as an example using FIG. 13 where only a host A is connected to the storage device 100, and the host A accesses an LUN-A and an LUN-B. Hereinafter, a performance limit of the host A is 200 (MB/s), a performance limit of the LUN-A is 150 (MB/s), a performance limit of the LUN-B is 100 (MB/s) and the performance limit of the port is 250 (MB/s).

First, a case will be described where the host A uses the LUN-A and the LUN-B to the same degree. Performances of the LUN-A and the LUN-B are limited in the same manner as illustrated in FIG. 9. For example, the storage device 100 processes an access from the host A to the LUN-A at 120 (MB/s), and processes an access from the host A to the LUN-B at 80 (MB/s).

Then, when the rate the host A uses the LUN-A becomes significantly higher, the scheduling unit 506 schedules, for example, processing up to the performance limit of the LUN-A. As a result, the storage device 100 according to the second embodiment processes an access from the host A to the LUN-A at 150 (MB/s), and processes an access from the host A to the LUN-B at 50 (MB/s).

A case will be described below where the storage device 100 processes the access from the host A to the LUN-A at 150 (MB/s), and the host A has stopped accessing the LUN-B for 30 seconds or more. In this case, the determining unit 602 determines that the state where the entire performance of the storage device 100 is not exhibited has passed for 30 seconds or more, and increases the priority order of the access from the host A to the LUN-A by one level. As a result, the storage device 100 according to the second embodiment allocates performance equal to or more than the performance limit of the LUN-A, and can process the access from the host A to the LUN-A at 200 (MB/s).

Further, a case will be described where the host A then accesses the LUN-B. In this case, the storage device 100 according to the second embodiment decreases the priority order of the access to the LUN-A by one level, processes the access from the host A to the LUN-A at 150 (MB/s) and processes the access from the host A to the LUN-B at 50 (MB/s). In addition, the storage device 100 according to the second embodiment performs scheduling to process, for example, an access to the LUN-A at 120 (MB/s) and process an access from the host A to the LUN-B at 80 (MB/s) according to an access situation to the LUN-A and the LUN-B.

[c] Third Embodiment

A case has been described with the second embodiment as an example where, when a state where entire performance of the storage device 100 is not exhibited passes for a predetermined period of time or more, performance is allocated more than a performance limit by increasing a priority order by one level, and processing is executed. By the way, in some cases, the storage device 100 needs to perform processing of a higher priority without setting a performance limit.

Meanwhile, when processing is performed without setting the performance limit, processing of a higher priority occupies performance of the storage device, and other processings may not be executed in some cases. Hence, a case will be described with the third embodiment as an example where a limitless setting for specifying each target and providing no performance limit is set to processing of a higher priority, and, when the processing of a higher priority occupies the performance of the storage device, the limitless setting is downgraded to a maximum value of a limited setting.

Configurations of Storage System and Storage Device according to Third Embodiment The configuration of the storage system according to the third embodiment is the same as the configuration of a storage system according to the first embodiment illustrated in FIG. 1 except that a functional configuration of a SCSI target control unit is different in firmware executed by the storage device. Hence, the configuration of the storage system according to the third embodiment and the configuration of the storage device according to the third embodiment will not be described.

Functional Configuration of SCSI Target Control Unit according to Third Embodiment The functional configuration of the SCSI target control unit according to the third embodiment is the same as a functional configuration of a SCSI target control unit according to the second embodiment illustrated in FIG. 10 except that information stored in a QoS management table and operations of a determining unit and a changing unit are different. Hence, the third embodiment will be described by replacing a SCSI target control unit 600 with a SCSI target control unit 700, a QoS management table 501 with a QoS management table 701, a determining unit 602 with a determining unit 702 and a changing unit 603 with a changing unit 703.

As illustrated in FIG. 10, the SCSI target control unit 700 according to the third embodiment has the QoS management table 701, a waiting queue storage unit 502, a performance setting unit 503, a command receiving unit 504, a calculating unit 505, a scheduling unit 506, an executing unit 507, the determining unit 702 and the changing unit 703.

The QoS management table 701 stores the following information in addition to information stored in a QoS management table according to the first embodiment. For example, the QoS management table 701 according to the third embodiment stores a value selected from a priority of 16 levels from 0 to 15 as a priority order. Meanwhile, with a target for which the priority order is set to "0", the number of limit IOs and the number of limit blocks are limitless in the entire performance of the storage device 100. In addition, the same priority order according to the first embodiment applies to 1 to 15 of the priority order.

The determining unit 702 determines whether or not a load state of input/output processing changes based on the number of execution of commands and the entire performance of the storage device 100. When, for example, input/output processing of an LUN for which the priority order is set to "0" continues occupying the number of executable input/output processings based on the entire performance of the storage device 100 for a predetermined period of time, the determining unit 702 determines that the load state of the input/output processings has changed.

For example, the determining unit 702 determines whether or not "the number of current IOs" and "the number of current blocks" of an LUN for which the priority stored in the QoS management table 701 is not "0" for the predetermined period of time. Hereinafter, the predetermined period of time is, for example, 30 seconds. In addition, the LUN for which the priority order is not set to "0" means an LUN of a limited performance value.

Subsequently, when determining that a state where the LUN for which the priority order is set to "0" continues occupying the entire performance of the storage device 100 for the predetermined period of time has passed for 30 seconds or more, the determining unit 702 determines whether or not there is a command for the LUN of the limited performance value. When, for example, there is the command for the LUN of the limited performance value, the determining unit 702 notifies to the changing unit 703 that the priority order of the LUN for which the priority order is set to "0" is to be decreased to "1".

Further, even after the priority order of the LUN for which the priority order is set to "0" is decreased to "1", the determining unit 702 determines whether or not the entire performance of the storage device 100 continues to be occupied for the predetermined period of time.

When the determining unit 702 determines that the load state of the input/output processings has changed, the changing unit 703 changes the priority order of the LUN for which the priority order is set to "0" to "1". In addition, although a case has been described as an example where the changing unit 703 downgrades the priority order of the LUN for which the priority order is set to "0" to "1", the present invention is not limited to this. For example, the changing unit 703 may downgrade the priority order of the LUN for which the priority order is set to "0" to "2".

Further, when the determining unit 702 determines that the LUN for which the priority order has been changed from "0" to "1" does not continue occupying the number of executable input/output processings based on the entire performance of the storage device 100 for the predetermined period of time, the changing unit 703 changes the priority back to "0" which is the priority order of before the change.

In addition, each function of the QoS management table 701, the determining unit 702 and the changing unit 703 is realized by collaborating the memory 210*a* and the memory 210*b*, and the CPU 220*a* and the CPU 220*b*.

Procedure of Processing of Storage Device According to Third Embodiment

Next, a procedure of processing of the storage device 100 according to the third embodiment will be described using FIG. 14. Hereinafter, a procedure of limit value setting adjustment processing of the storage device according to the third embodiment will be described using FIG. 14.

Limit Value Setting Adjustment Processing

Figure 14:
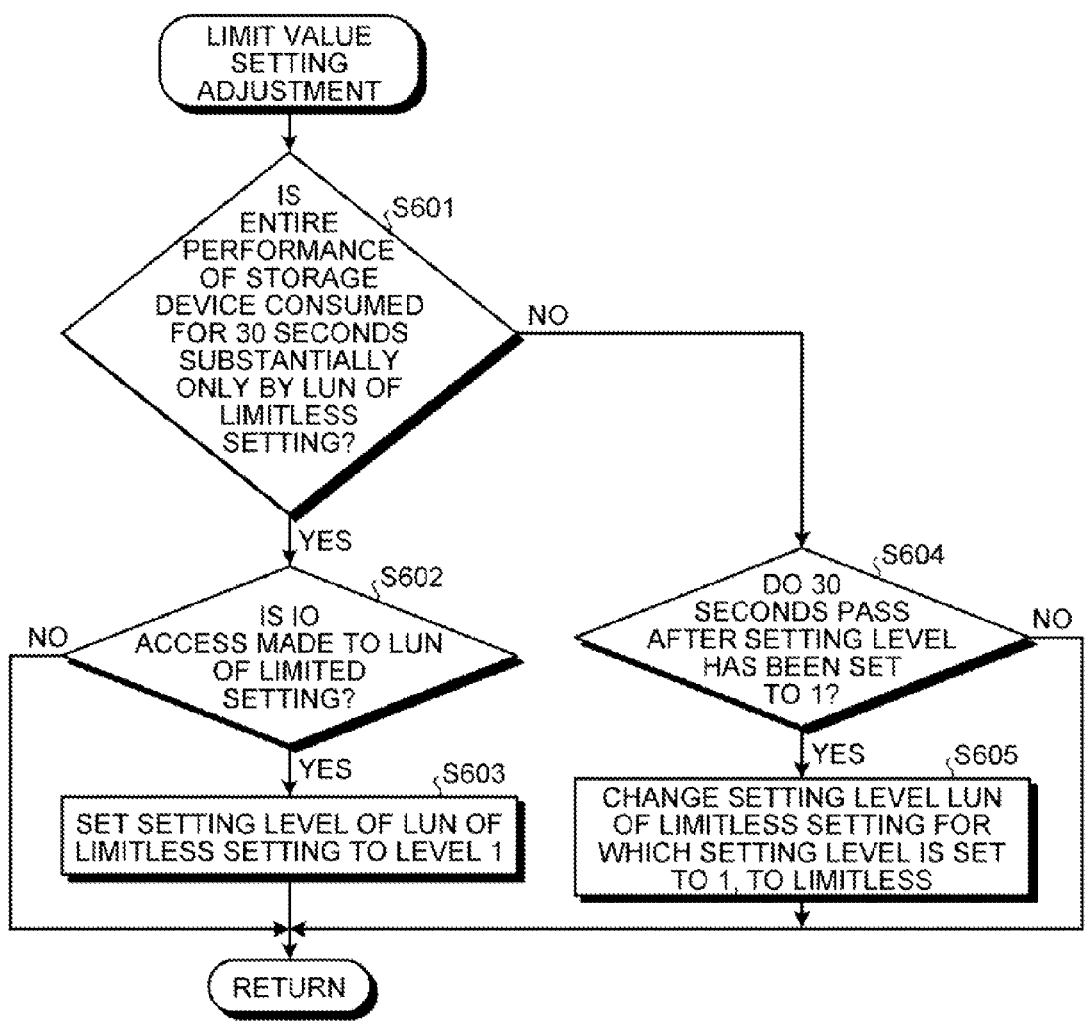
FIG. 14 is a flowchart illustrating a procedure of limit value setting adjustment processing of a storage device according to a third embodiment.

FIG. 14 is a flowchart illustrating the procedure of the limit value setting adjustment processing of the storage device according to the third embodiment.

As illustrated in FIG. 14, the determining unit 702 determines whether or not the entire performance of the storage device 100 is consumed for 30 seconds substantially only by the LUN of the limitless setting (step S601). Meanwhile, when determining that the entire performance 100 of the storage device is consumed for 30 seconds substantially only by the LUN of the limitless setting (Yes in step S601), the determining unit 702 determines whether or not an IO access is made to an LUN of a limited setting (step S602).

When the determining unit 702 determines that the IO access is made to the LUN of the limited setting (Yes in step S602), the changing unit 703 sets a setting level of the LUN of the limitless setting to level 1 (step S603), and finishes processing. Meanwhile, when determining that no IO access is made to the LUN of the limited setting (No in step S602), the determining unit 702 finishes processing.

Further, when determining that the entire performance of the storage device 100 has not been consumed for 30 seconds substantially only by the LUN of the limitless setting (No in step S601), the determining unit 702 determines whether or not 30 seconds or more has passed after the setting level is set to level 1 (step S604).

When the determining unit 702 determines that 30 seconds or more has passed after the setting level was set to level 1 (Yes in step S604), the changing unit 703 executes the following processing. That is, the changing unit 703 changes the setting level of the LUN of the limitless setting for which the setting level has been set to 1 back to limitless (step S605), and finishes processing. Meanwhile, when determining that 30 seconds or more has not passed after the setting level was set to level 1 (No in step S604), the determining unit 702 finishes processing.

Effect according to Third Embodiment

Figure 15:
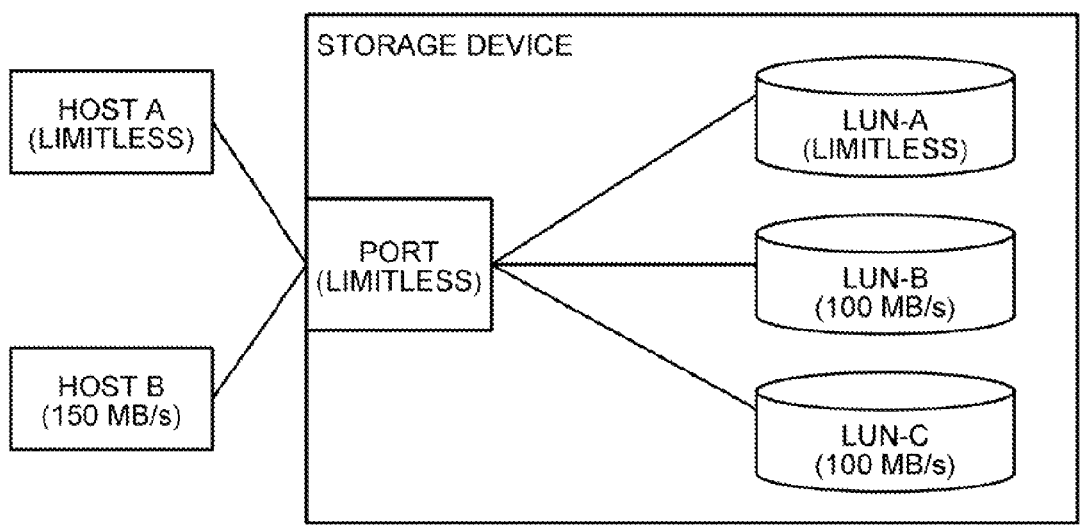
FIG. 15 is a view illustrating an example of an effect of the storage device according to the third embodiment.

Next, an example of an effect of the storage device 100 according to the third embodiment will be described using FIG. 15. FIG. 15 is a view illustrating an example of the effect of the storage device according to the third embodiment. A case will be described with an example illustrated in FIG. 15 where a host A can access an LUN-A and an LUN-B, and a host B can access an LUN-C. Hereinafter, a performance limit of the host A is limitless (MB/s), and a performance limit of the host B is 150 (MB/s). Further, the performance limit of the LUN-A is limitless (MB/s), a performance limit of the LUN-B is 100 (MB/s), a performance limit of an LUN-C is 100 (MB/s), and a performance limit of a port is limitless (MB/s). Furthermore, a case will be assumed where the actual entire performance of the storage device 100 is, for example, 1000 (MB/s).

A case will be described first where performance of the host A for using the LUN-A is 800 (MB/s) or less. With the third embodiment, when there are a limitless setting and a normal performance limited setting, performance from which performance (band) used by limitless setting targets is subtracted is basically shared between targets for which a performance limited setting is set. For example, in this case, 100 (MB/s) which is performances of the host A-LUN-B and the host B-LUN-C is allocated.

Next, a case will be described where the performance of the host A for using the LUN-A becomes 900 (MB/s). In this case, performance of the host A for accessing the LUN-B and performance of the host B for accessing the LUN-C are 50 (MB/s), respectively.

Next, a case will be described where the host A uses the LUN-A at 1000 (MB/s) or more at all times. In this case, the determining unit 702 determines that a state where only an access from the host A to the LUN-A occupies performance of the storage device 100 has passed for a predetermined period of time or more. Further, the changing unit 703 changes a setting which is performance of accessing from the host A to the LUN-A to 750 (MB/s) which is the maximum value of the priority order. Subsequently, the scheduling unit 506 performs scheduling based on the changed priority order.

As described above, with the third embodiment, when the limitless setting continues using performance (band), the limitless setting is decreased to the same performance as the maximum level of the normal performance limited setting and is controlled. When, for example, it is detected that performance of an I/O continues using with respect to the LUN of the limitless setting the substantially entire performance of the storage for 30 seconds of a unit time, the performance level of the LUN of the limitless setting is downgraded to the maximum level of the limited setting. As a result, the storage device 100 according to the third embodiment preferentially processes an access from the host A to the LUN-A, so that it is possible to guarantee an access from the host A to the LUN-B and an access from the host B to the LUN-C.

[d] Fourth Embodiment

By the way, the present invention may be implemented in various different modes in addition to the above embodiments. Hence, another embodiment included in the present invention will be described with a fourth embodiment.

System Configuration and the Like

The entirety or part of processing which has been described to be automatically performed in each processing described in the present embodiments may be partially and manually performed. Alternatively, the entirety or part of processing which has been described to be manually performed may be automatically performed by a known method. In addition, a procedure, a control procedure and a specific name described in the description and illustrated in the drawings can be arbitrarily changed unless specified.

Further, in a case where the storage device 100 deletes a target when, for example, an LUN goes out of order or a host logs out or a target is added when an LUN is added or a host logs in, performance may be dynamically allocated again between all targets related to corresponding ports. Hence, a case will be described with the fourth embodiment where the storage device 100 has a function of deleting or adding a scheduling target according to N millisecond timer scheduling immediately after the target is deleted or added. In addition, the performance setting unit 503 is assumed to have a function of deleting or adding this scheduling target.

Figure 16:
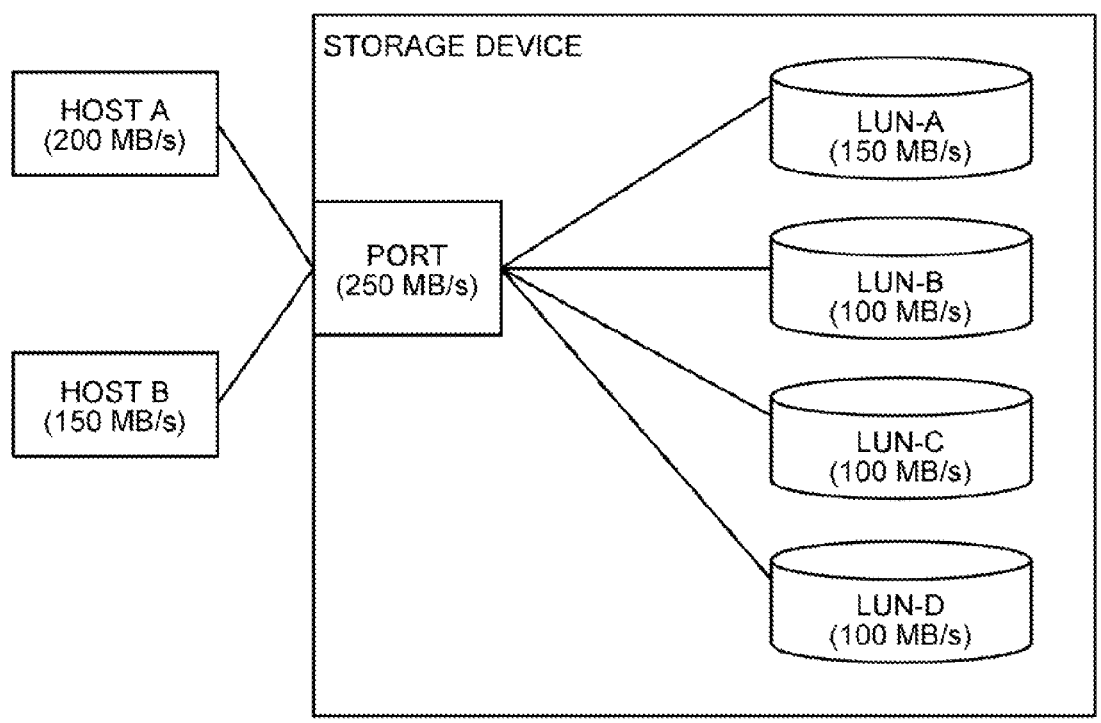
FIG. 16 is a view illustrating an example of an effect of a storage device according to a fourth embodiment.

An example of an effect of the storage device 100 according to the fourth embodiment will be described using FIG. 16. FIG. 16 is a view illustrating an example of the effect of the storage device according to the fourth embodiment. A case will be described with an example illustrated in FIG. 16 where a host A can access an LUN-A and an LUN-B, a host B can access an LUN-C and an LUN-D to which the host B can access is newly added. Meanwhile, the performance limit of the host A is 200 (MB/s), and a performance limit of the host B is 150 (MB/s). Further, a performance limit of the LUN-A is 150 (MB/s), a performance limit of the LUN-B is 100 (MB/s), a performance limit of an LUN-C is 100 (MB/s), a performance limit of the LUN-D is 100 (MB/s), and a performance limit of a port is 250 (MB/s).

For example, before the LUN-D is added, the host A uses the LUN-A at 107 (MB/s), and uses the LUN-B at 71 (MB/s). Further, the host B uses the LUN-C at 71 (MB/s).

Furthermore, after the LUN-D is added, the host A uses the LUN-A at 83 (MB/s), and uses the LUN-B at 56 (MB/s). Still further, the host B uses the LUN-C at 56 (MB/s), and uses the LUN-D at 56 (MB/s). Moreover, when the host B logs out and does not log in again for a little while, the host A uses the LUN-A at 120 (MB/s) and uses the LUN-B at 80 (MB/s).

As described above, even when a combination of a host and an LUN to be used changes, the storage device 100 according to the fourth embodiment dynamically allocates performance of the storage device 100, and can easily realize a QoS function of the storage.

Further, each illustrated component is a functional concept, and does not necessarily need to be configured physically as illustrated. For example, in a SCSI command control unit 304, a command receiving unit 504 and a scheduling unit 506 may be integrated. Further, the entirety or arbitrary part of each processing function of each device can be realized by a CPU or a program which is analyzed and executed by the CPU or can be realized by hardware based on a wired logic.

Figure 17:
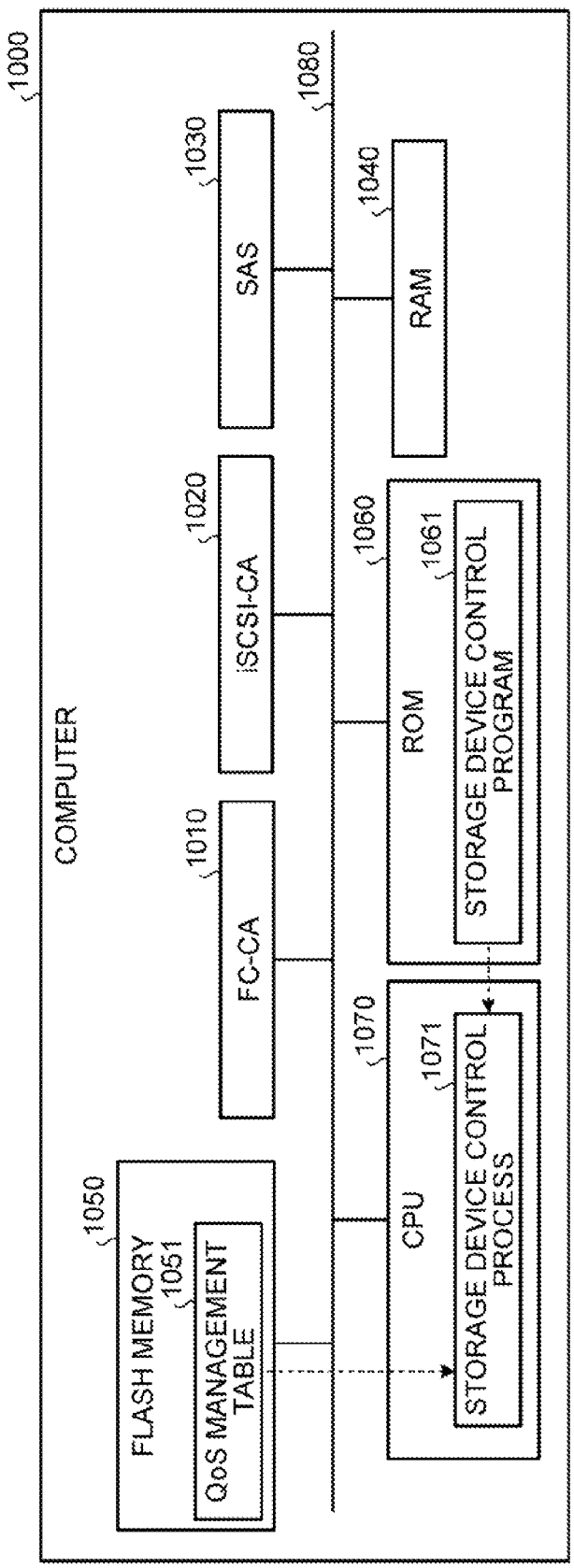
FIG. 17 is a view illustrating a computer which executes a storage device control program.

Furthermore, various processings described in the above embodiments can be realized by executing a program prepared in advance by a computer of the storage device. Hence, an example of the computer which executes a storage device control program having the same function as in the embodiments will be described using FIG. 17. FIG. 17 is a view illustrating the computer which executes the storage device control program.

As illustrated in FIG. 17, a computer 1000 has a FC-CA 1010 which is an interface to a host, an iSCSI-CA 1020 which is an interface to the host and a SAS 1030 which is an interface to a disk device. Further, the computer 1000 has a RAM 1040 which temporarily stores various pieces of information, and a non-volatile flash memory 1050 in which data is rewritable and is not erased even if power is turned off. Furthermore, the computer 1000 has an ROM (Read Only Memory) 1060 which is a read dedicated memory and a CPU 1070 which executes various computation processings. Still further, each unit of the computer 1000 is connected through a bus 1080.

Moreover, a QoS management table 1051 corresponding to a QoS management table 501 illustrated in FIG. 3 is stored in the flash memory 1050. Further, in the ROM 1060, a storage device control program 1061 having the same functions as a calculating unit 505, a scheduling unit 506 and an executing unit 507 illustrated in FIG. 3 is stored.

Furthermore, the CPU 1070 refers to the QoS management table 1051 read from the flash memory 1050, and executes the storage device control program 1061 read from the ROM 1060 as a storage device control process 1071.

In addition, the above storage device control program 1061 does not need necessarily to be stored in the ROM 1060, and this program stored in a storage medium such as a CD-ROM may be read and executed by the computer 1000. Further, this program may be stored in another computer (or a server) connected to the computer 1000 through a public network, Internet, a LAN and a WAN (Wide Area Network), and the computer 1000 may read the program from another computer and execute the program.

It is possible to easily realize a QoS function of a storage.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
 a memory; and
 a processor coupled to the memory, wherein the processor executes a process comprising:
 calculating an upper limit value, for each of an information processing device, a port that is an interface between the information processing device and the storage device and a combination of the information processing device and a memory device of the storage device, of the number of executable input/output processings, based on a priority set respectively to the information processing device, the port and the combination, the priority indicating a performance limit predetermined;
 scheduling an execution order of input/output processings based on the number of input/output processings received from the information processing device and the calculated upper limit value; and
 executing the input/output processings in the scheduled execution order.

2. The storage device according to claim 1, wherein the process further comprises:
 determining whether or not a load state of specific input/output processings changes, based on the number of execution of the input/output processings and a processing capacity of the input/output processings of the storage device; and
 when determining that the load state of the input/output processings has changed, changing the priority used to determine the number of input/output processings of the specific input/output processings, wherein
 the scheduling includes scheduling the execution order of the input/output processings based on the upper limit value of the number of the input/output processings determined based on the changed priority and the number of input/output processings received from the information processing device.

3. The storage device according to claim 2, wherein
 the determining includes, when the number of execution of the specific input/output processings continues going below the number of executable input/output processings based on the processing capacity for a predetermined period of time, determining that the load state of the specific input/output processings has changed, and the changing includes, when determining that the load state of the specific input/output processings has changed, changing the priority used to determine the number of input/output processings of the specific input/output processings.

4. The storage device according to claim 3, wherein the determining includes determining after the priority is changed whether or not the number of execution of the specific input/output processings continues going below the number of executable input/output processings based on the processing capacity for the predetermined period of time, and the changing includes, when determining that the number of execution of the specific input/output processings does not continue going below the number of executable input/output processings based on the processing capacity for the predetermined period of time, changing the priority to a value before the change.

5. The storage device according to claim 2, wherein the determining includes, when the specific input/output processings continue occupying the number of executable input/output processings based on the processing capacity for the predetermined period of time, determining that the load state of the specific input/output processings has changed, and the changing includes, when determining that the load state of the specific input/output processings has changed, changing the priority used to determine the number of input/output processings of the specific input/output processings, to a value lower than a set value.

6. The storage device according to claim 5, wherein the determining includes determining after the priority is changed to the value lower than the set value whether or not the specific input/output processings continue occupying the number of executable input/output processings based on the processing capacity for the predetermined period of time, and the changing includes, when determining that the specific input/output processings do not continue occupying the number of executable input/output processings based on the processing capacity for the predetermined period of time, changing the priority to a value before the change.

7. The storage device according to claim 1, wherein the process further comprises:

receiving the input/output processings from the information processing device, and determining whether or not there is input/output processing waiting to be executed, using the processor, wherein the scheduling includes, when determining that there is the input/output processing waiting to be executed, scheduling the execution order of the input/output processings after the predetermined period of time passes.

8. The storage device according to claim 7, wherein the scheduling includes, when determining that there is no input/output processing waiting to be executed, scheduling the execution order of the input/output processings without waiting for the predetermined period of time to pass.

9. The storage device according to claim 7, wherein the scheduling includes determining whether or not the number of input/output processings received from the information processing device is within the calculated upper limit value and, when determining that the number of received input/output processings is within the upper limit value, scheduling the execution order of the input/output processings by subtracting the number of received input/output processings from the upper limit value.

10. The storage device according to claim 9, wherein the scheduling includes, when determining that the number of received input/output processings is not within the upper limit value, determining after the predetermined period of time passes whether or not the number of input/output processings received from the information processing device is within the calculated upper limit value.

11. The storage device according to claim 1, wherein the process further comprises:

when an information processing device connected with the storage device and a memory device used by the information processing device change, updating information indicating priority stored in a memory and set to each of an information processing device, a port that is an interface between the information processing device and the storage device and a memory device, using the processor.

12. A method of controlling a storage device, the method comprising:

calculating an upper limit value, for each of an information processing device, a port that is an interface between the information processing device and the storage device and a combination of the information processing device and a memory device of the storage device, of the number of executable input/output processings, based on a priority set respectively to the information processing device, the port and the combination, the priority indicating a performance limit predetermined, using a processor;

scheduling an execution order of input/output processings based on the number of input/output processings received from the information processing device and the calculated upper limit value, using the processor; and executing the input/output processings in the scheduled execution order, using the processor.

13. The method of controlling the storage device according to claim 12, the method further comprising:

determining whether or not a load state of specific input/output processings changes, based on the number of execution of the input/output processings and a processing capacity of the input/output processings of the storage device, using the processor; and when determining that the load state of the input/output processings has changed, changing the priority usec to determine the number of input/output processings of the specific input/output processings, using the processor, wherein the scheduling includes scheduling the execution order of the input/output processings based on the upper limit value of the number of the input/output processings determined based on the changed priority and the number of input/output processings received from the information processing device.

14. The method of controlling the storage device according to claim 13, wherein:

the determining includes, when the specific input/output processings continue occupying the number of executable input/output processings based on the processing capacity for the predetermined period of time, determining that the load state of the specific input/output processings has changed; and the changing includes, when determining that the load state of the specific input/output processings has changed, changing the priority used to determine the number of input/output processings of the specific input/output processings, to a value lower than a set value.

15. The method of controlling the storage device according to claim 12, the method further comprising:
   receiving the input/output processings from the information processing device, and determining whether or not there is input/output processing waiting to be executed, using the processor, wherein
   the scheduling includes, when determining that there is the input/output processing waiting to be executed, scheduling the execution order of the input/output processings after the predetermined period of time passes.

16. The method of controlling the storage device according to claim 12, the method further comprising:
   when an information processing device connected with the storage device and a memory device used by the information processing device change, updating information indicating priority stored in a memory and set to each of an information processing device, a port that is an interface between the information processing device and the storage device and a memory device, using the processor.

17. A non-transitory computer-readable recording medium having stored therein a program for causing a computer to execute a process for controlling a storage device, the process comprising:
   calculating an upper limit value, for each of an information processing device, a port that is an interface between the information processing device and the storage device and a combination of the information processing device and a memory device of the storage device, of the number of executable input/output processings, based on a priority set respectively to the information processing device, the port and the combination, the priority indicating a performance limit predetermined;
   scheduling an execution order of input/output processings based on the number of input/output processings received from the information processing device and the calculated upper limit value; and
   executing the input/output processings in the scheduled execution order.

18. The non-transitory computer-readable recording medium according to claim 17, wherein the process further comprises:
   determining whether or not a load state of specific input/output processings changes, based on the number of execution of the input/output processings and a processing capacity of the input/output processings of the storage device; and
   when determining that the load state of the input/output processings has changed, changing the priority used to determine the number of input/output processings of the specific input/output processings, wherein
   the scheduling includes scheduling the execution order of the input/output processings based on the upper limit value of the input/output processings determined based on the changed priority and the number of input/output processings received from the information processing device.

19. The non-transitory computer-readable recording medium according to claim 17, wherein the process further comprises:
   receiving the input/output processings from the information processing device, and determining whether or not there is input/output processing waiting to be executed, wherein
   the scheduling includes, when determining that there is the input/output processing waiting to be executed, scheduling the execution order of the input/output processings after the predetermined period of time passes.

20. The non-transitory computer-readable recording medium according to claim 17, wherein the process further comprises:
   when an information processing device connected with the storage device and a memory device used by the information processing device change, updating information indicating priority stored in a memory unit and set to each of an information processing device, a port that is an interface between the information processing device and the storage device and a memory device.

* * * * *